(12) United States Patent
Ma et al.

(10) Patent No.: US 12,055,624 B2
(45) Date of Patent: Aug. 6, 2024

(54) BUILDING RISK MONITORING AND PREDICTING BASED ON METHOD INTEGRATING MT-InSAR AND PORE WATER PRESSURE MODEL

(71) Applicant: Peifeng Ma, Shandong (CN)

(72) Inventors: Peifeng Ma, Shandong (CN); Yi Zheng, Fujian (CN); Zhengjia Zhang, Wuhan (CN); Zherong Wu, Shanxi (CN); Chang Yu, Guangdong (CN)

(73) Assignee: Peifeng Ma, Jimo (CN)

( * ) Notice: Subject to any disclaimer, the term of this patent is extended or adjusted under 35 U.S.C. 154(b) by 0 days.

(21) Appl. No.: 18/493,922

(22) Filed: Oct. 25, 2023

(65) Prior Publication Data

US 2024/0142613 A1 May 2, 2024

(30) Foreign Application Priority Data

Oct. 26, 2022 (CN) .......................... 202211320799.3

(51) Int. Cl.
*G01S 13/90* (2006.01)
*G06F 30/20* (2020.01)
(Continued)

(52) U.S. Cl.
CPC .......... *G01S 13/9023* (2013.01); *G06F 30/20* (2020.01); *G06T 7/001* (2013.01);
(Continued)

(58) Field of Classification Search
CPC ....... G01S 13/9023; G06T 7/13; G06T 7/001; G06T 2207/10044; G06F 30/20; G06F 2111/10
See application file for complete search history.

(56) References Cited

U.S. PATENT DOCUMENTS 8,305,253 B1* 11/2012 Hershkowitz ......... G01S 13/904
342/25 A
2017/0365094 A1* 12/2017 Liu ........................ G06V 20/13
(Continued)

FOREIGN PATENT DOCUMENTS

AU 2021439678 A1 6/2023
CN 103970932 A 8/2014
(Continued)

OTHER PUBLICATIONS

SARscape user Guide.*
(Continued)

*Primary Examiner* — Mohamed Charioui
*Assistant Examiner* — Lynda Dinh
(74) *Attorney, Agent, or Firm* — Piloff Passino & Cosenza LLP; Rachel K. Piloff; Sean A. Passino

(57) ABSTRACT

A method for InSAR assessment and prediction of risk level of urban buildings is provided, and includes the following steps: obtaining multi-channel SAR images of the urban buildings, extracting monitoring points in the multi-channel SAR images, and obtaining InSAR monitoring results of the urban buildings based on areas of the monitoring points, wherein the monitoring points comprise permanent scatterers and distributed scatterers; obtaining building outlines, obtaining deformation parameters based on the building outlines and the InSAR monitoring results, and assessing a building risk level based on the deformation parameters, wherein the deformation parameters comprise deformation velocity parameters and angle distortion parameters; constructing a stress-pore water pressure model, and carrying out a building risk prediction on the numerical simulation results based on set building risk level.

5 Claims, 50 Drawing Sheets

(51) Int. Cl.
*G06T 7/00* (2017.01)
*G06T 7/13* (2017.01)
*G06F 111/10* (2020.01)

(52) U.S. Cl.
CPC ............ *G06T 7/13* (2017.01); *G06F 2111/10* (2020.01); *G06T 2207/10044* (2013.01)

(56) References Cited

U.S. PATENT DOCUMENTS

2018/0075319 A1* 3/2018 Xu .................... G06F 18/22
2021/0011149 A1 1/2021 Hu et al.

FOREIGN PATENT DOCUMENTS

| CN | 104123464 A | 10/2014 |
| CN | 108663017 A | 10/2018 |
| CN | 108919266 A | 11/2018 |
| CN | 10938888 A | 2/2019 |
| CN | 110055945 A | 7/2019 |
| CN | 110058237 A | 7/2019 |
| CN | 110389366 A * | 10/2019 |
| CN | 108256471 B * | 8/2020 |
| CN | 113096005 A | 7/2021 |
| CN | 113609730 A * | 11/2021 |
| CN | 114966689 A | 8/2022 |
| CN | 115166737 A | 10/2022 |
| KR | 102086323 B1 | 5/2020 |
| WO | 2019126972 A1 | 7/2019 |
| WO | 2020233591 A1 | 11/2020 |
| WO | 2022213673 A1 | 10/2022 |

OTHER PUBLICATIONS

Yang Yuanxin et al., "Subsidence monitoring of an airport based on PS-InSAR and SBAS-InSAR technology," Geotechnical Investigation & Surveying, Aug. 2020, pp. 59-66.

Yao Xin et al., "Co-seismic deformation characteristics of Wenchuan earthquake based on differential interferometric radar," Journal of geomechanics, Jun. 2009, vol. 15, No. 2.

Qiao Xin et al., "Deformation characteristics and kinematic parameter inversion of Haiyuan fault zone based on time series InSAR," Seismogeology and Geology, Dec. 2019, vol. 41, No. 6.

First Search Report for China Application No. 202211320799.3.

Notification to Grant Patent for China Application No. 202211320799.3, mailed Aug. 10, 2023.

* cited by examiner

BUILDING RISK MONITORING AND PREDICTING BASED ON METHOD INTEGRATING MT-InSAR AND PORE WATER PRESSURE MODEL

CROSS-REFERENCE TO RELATED APPLICATIONS

This application claims priority to Chinese Patent Application No. 202211320799.3, filed on Oct. 26, 2022, the contents of which are hereby incorporated by reference.

TECHNICAL FIELD

The application belongs to the field of building risk prediction, and in particular to a method for InSAR assessment and prediction of risk level of urban buildings.

BACKGROUND

With the rapid development of urbanization, human activities become more frequent. Urban infrastructure construction, especially underground engineering, often leads to land subsidence, which in turn endangers adjacent buildings. In order to ensure the safety of people's lives and property, it is necessary to assess and predict the land subsidence and the building risk level in quasi-real time.

At present, geodesy technology has been used in subsidence monitoring. However, technologies such as global positioning system and leveling cannot realize large-scale subsidence monitoring considering the cost. Interferometric Synthetic Aperture Radar (InSAR) remote sensing technology has been proved to be an effective technical method to realize large-scale area monitoring. Using microwave signals, all-weather monitoring may also be realized under cloudy and rainy conditions. The permanent scatterer InSAR technology uses multiple SAR images to identify the permanent scatterers (PSs), which makes the measurement accuracy reach millimeter level. PSs refers to relatively stable points on Synthetic Aperture Radar (SAR) images, corresponding to highly reflective objects (such as metal structures and exposed rocks) in the monitoring scene. In order to increase the points in low coherence areas (such as plants and roads), some scholars proposed SqueeSAR to extract distributed scatterers (DSs). DSs has similar reflectivity value with neighboring pixels, so the coherence of DSs may be improved by homogeneous filtering. In addition to algorithm optimization, SAR satellites have also made great progress in the past decade. Especially, the launch of X-band high-resolution satellites (such as TerraSAR-X and COSMO-SkyMed) has higher resolution than C-band satellite images, and the number of pixels per square kilometer reaches tens of thousands, which provides a strong guarantee for deformation monitoring of infrastructure such as buildings and bridges that need high-precision measurement. The launch of the practical Sentinel-1 satellite has achieved regular monitoring on a global scale, and each revisit takes 12 days, which provides a guarantee for large-scale real-time monitoring. With the optimization of InSAR algorithm and the development of SAR satellites, InSAR has been widely used in building risk assessment on a large area scale. For example, some scholars used multi-spatio-temporal InSAR(MTInSAR) and relative stiffness method to assess the building risk caused by underground construction of Crossrail in London, and some scholars used multi-sensor satellite images to assess the degree of building damage caused by landslide movement. Although the ability of InSAR in building risk assessment has been proved, the application in building deformation and risk level prediction is relatively rare.

SUMMARY

The objective of the application is to provide a method for InSAR assessment and prediction of risk level of urban buildings, so as to solve the problems existing in the prior art.

In order to achieve the above objective, the application provides a method for InSAR assessment and prediction of risk level of urban buildings, which includes the following steps:

obtaining multi-channel SAR images of the urban buildings, extracting monitoring points in the multi-channel SAR images, and obtaining InSAR monitoring results of the urban buildings based on areas of the monitoring points, where the monitoring points include permanent scatterers and distributed scatterers;

obtaining building outlines, obtaining deformation parameters based on the building outlines and the InSAR monitoring results, and assessing a building risk level based on the deformation parameters, where the deformation parameters include deformation velocity parameters and angle distortion parameters;

carrying out a time series fusion on the InSAR monitoring results to obtain a time series of SAR images, constructing a stress-pore water pressure model, inputting the time series into the stress-pore water pressure model to obtain numerical simulation results, and carrying out a building risk prediction on the numerical simulation results based on set building risk level.

Optionally, the multi-channel SAR images include TerraSAR-X satellite images, COSMO-SkyMed satellite images and Sentinel-1 satellite images.

Optionally, a process of extracting the monitoring points in the multi-channel SAR images includes:

preprocessing the multi-channel SAR images, constructing a double-layer network based on preprocessed multi-channel SAR images, and extracting the monitoring points in the multi-channel SAR images through the double-layer network.

Optionally, a process of extracting the monitoring points in the SAR images through the double-layer network includes:

constructing a first-layer network, obtaining preliminary estimation parameters based on a beamforming method, and obtaining the permanent scatterers based on the preliminary estimation parameters; where the preliminary estimation parameters include height parameters and the deformation velocity parameters;

based on the preprocessed multi-channel SAR images, constructing a second-layer network by a coherent weighted phase link, and obtaining the distributed scatterers by identifying pixels in the multi-channel SAR images by a time coherence threshold.

Optionally, a process of obtaining the deformation parameters includes:

generating the deformation velocity parameters into spatially continuous grid data, obtaining the building outlines based on the grid data, and calculating the building deformation parameters based on the building outlines and the InSAR monitoring results.

Optionally, a process of risk assessment of the building risk level includes:

obtaining risk assessment indicators, and assessing the building risk level based on the deformation parameters of the buildings through the risk assessment indicators;
where the risk assessment indicators include a building inclination direction, an annual minimum subsidence, an annual maximum subsidence, a differential subsidence and an angle distortion.

Optionally, a process of inputting the time series into the stress-pore water pressure model includes:
constructing the stress-pore water pressure model, and obtaining soil parameters by an inversion based on the InSAR monitoring results, and inputting the soil parameters into the stress-pore water pressure model, and carrying out a numerical simulation on bottom deformation and pore water pressure respectively.

Optionally, a process of carrying out the building risk prediction on the numerical simulation results includes:
inputting groundwater level change parameters and external force change parameters into the stress-pore water pressure model, and predicting the building risk level by changing the groundwater level change parameters and the external force change parameters based on the set building risk level.

The application has the following technical effects.

The application relates to a method for InSAR assessment and prediction of risk level of urban buildings, which uses multi-channel satellites to jointly monitor the deformation of permanent and distributed scatterers in urban areas, and uses multi-spatio-temporal InSAR and numerical simulation to monitor and predict the building deformation and building risk level. Firstly, on the urban scale, the building risk level is assessed by land subsidence and angle distortion to determine potential dangerous buildings. Then, taking the time series of high-resolution InSAR data as input for reference, combined with geological conditions, the geological and hydrological conditions of the area where dangerous buildings are located are inverted. Finally, the risk level of surrounding buildings is predicted by changing hydrological conditions and external load conditions. The method may be extended to other rapidly developing urban areas prone to land subsidence, so as to assess the risks of urban buildings areas and improve the cognition of dynamic behaviors of land subsidence caused by human activities.

BRIEF DESCRIPTION OF THE DRAWINGS

The accompanying drawings, which constitute a part of this application, are used to provide a further understanding of this application. The illustrative embodiments of this application and their descriptions are used to explain this application, and do not constitute an improper limitation of this application. In the attached drawings.

DETAILED DESCRIPTION OF THE EMBODIMENTS

It should be noted that the embodiments in this application and the features in the embodiments may be combined with each other without conflict. The present application will be described in detail with reference to the attached drawings and embodiments.

It should be noted that the steps shown in the flowchart of the accompanying drawings may be executed in a computer system such as a set of computer-executable instructions, and although the logical order is shown in the flowchart, in some cases, the steps shown or described may be executed in a different order from here.

Embodiment 1

Figure 1:
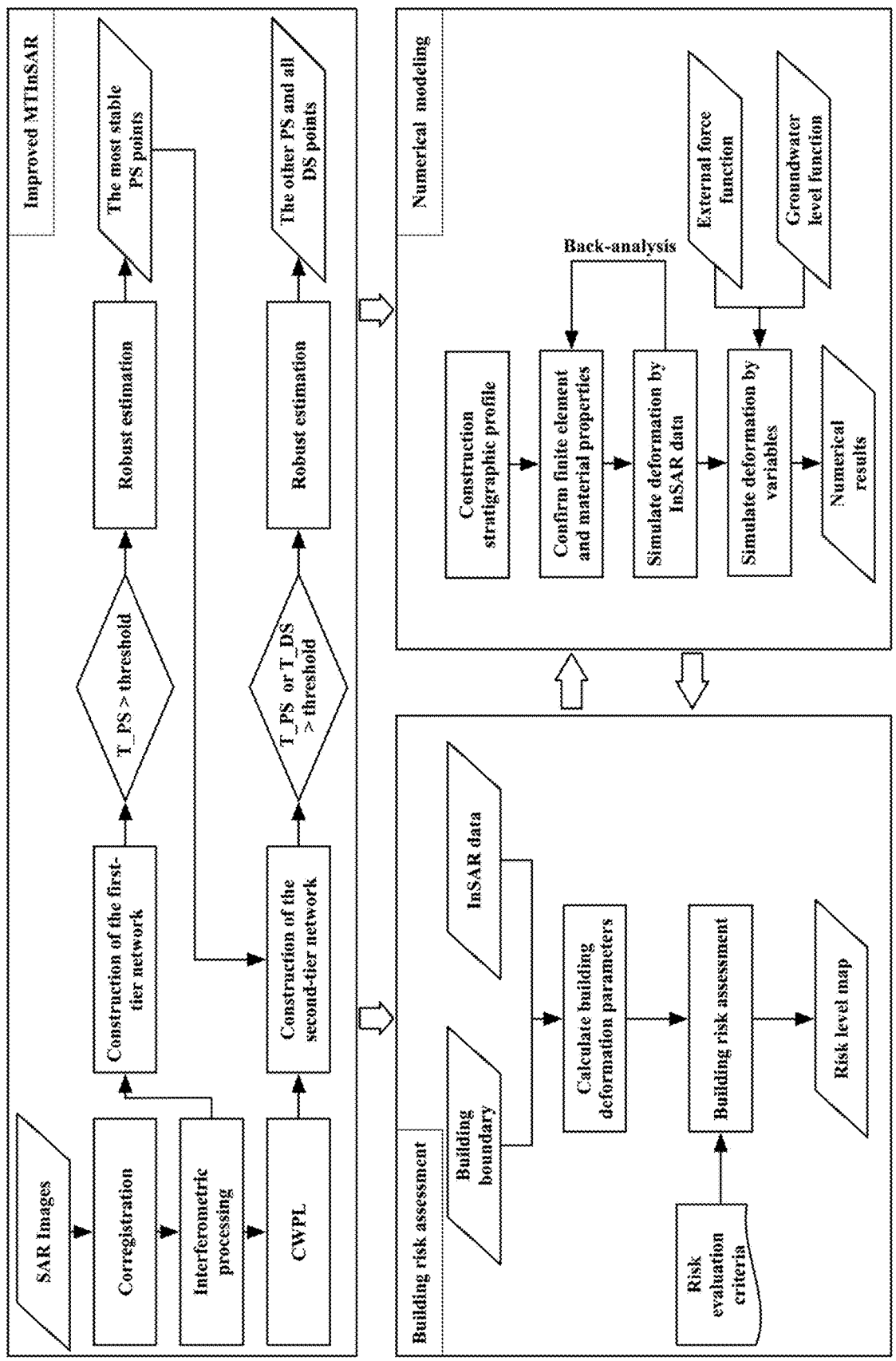
FIG. 1 is a flowchart of a method in an embodiment of the present application.

As shown in FIG. 1, this embodiment provides a method for InSAR assessment and prediction of risk level of urban buildings, which uses improved MTInSAR and numerical simulation technology to monitor and predict building deformation and risk level. Firstly, the improved MTInSAR method combined with robustness assessment may monitor more PSs and DSs and ensure the quantity and density of monitoring data. Secondly, the deformation and angle distortion of buildings calculated by InSAR monitoring may be used to determine the risk level of large-scale buildings. Finally, the soil parameters are inversed by the inverse analysis method and input into the soil engineering model for numerical simulation, and the deformation time series of buildings is simulated and predicted by changing the changes of groundwater level and complex changes on the ground. In order to verify the effectiveness of this method, two subsidence areas, Kowloon District of Hong Kong and Futian District of Shenzhen, were selected to verify the effectiveness and limitations of this method.

This embodiment mainly includes three key technologies for building risk monitoring and prediction: (1) improved MTInSAR multi-channel satellite deformation monitoring technology; (2) building deformation extraction technology and risk assessment technology; (3) finite element numerical simulation technology based on stress-pore water pressure model.

1.1 Improved MTInSAR Multi-Channel Deformation Monitoring Technology

The improved MTInSAR method is used to extract PSs and DSs to improve the monitoring data density. Firstly, the method uses GMTSAR software to preprocess the images, including image correction and differential interferometry. Then, a double-layer network is constructed to remove the atmospheric phase of coherent point pairs. In the first-layer network, firstly the most stable PS point is determined, and the inversion formula is:

$$y = A\gamma \qquad (1)$$

where $y=[y_1, \ldots, y_n]^T$ (n refers to the number of satellite images, $[\cdot]^T$ refers to transposition) is a differential interferogram, $\gamma$ refers to the reconstructed reflectivity, and A contains the relative parameters to be estimated, and the relative parameters are the relative heights of adjacent points and the average deformation velocity respectively. Here, firstly, beamforming is used to estimate the parameters. If the time domain coherence coefficient (T_PS) of PS is greater than the threshold (TerraSAR-X and COSMO-SkyMed threshold is 0.78, Sentinel-1 threshold is 0.72), the preliminary estimated parameters (height and deformation velocity) may be obtained. The preliminary estimated parameters are used to solve the time phase, and there may be a big error due to the existence of low signal-to-noise ratio (SNR) images. In order to solve this problem, the M-estimator method is used to iteratively reduce the weight of low SNR images and improve the robustness of parameters based on unwrapped phase. The relative estimated values are integrated through network adjustment. In order to solve the problem of insufficient adjustment conditions, the ridge estimator is used instead of the least square estimator to adjust the relative assessment value, thus improving the robustness of the estimation value.

Figure 2A:
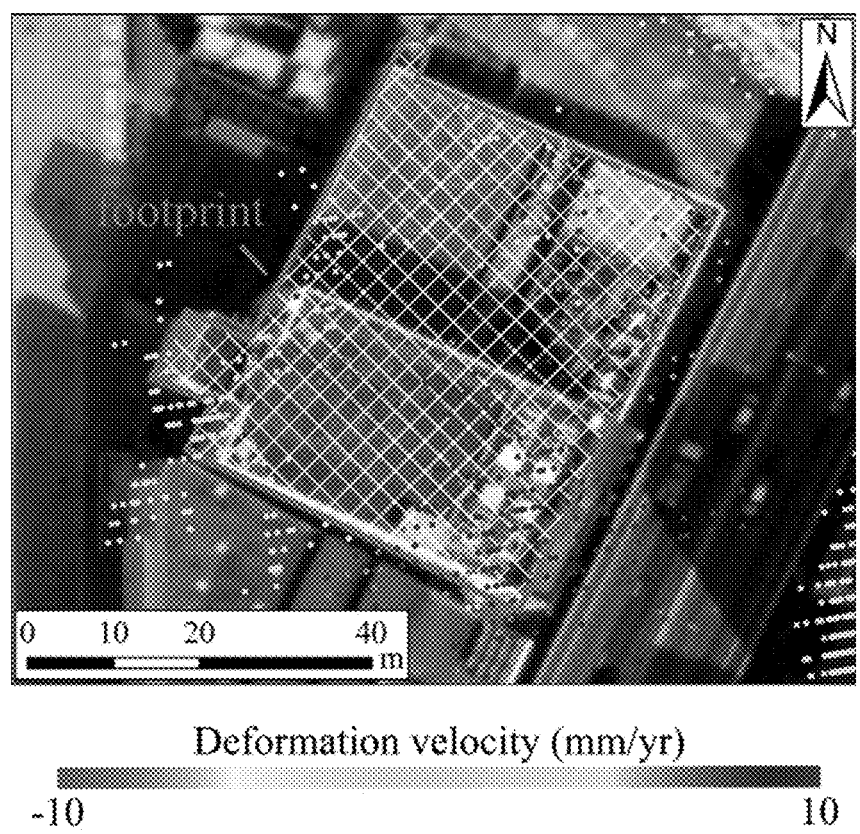
FIG. 2A is a PS and DS deformation velocity diagram in the embodiment of the present application.
Figure 2B:
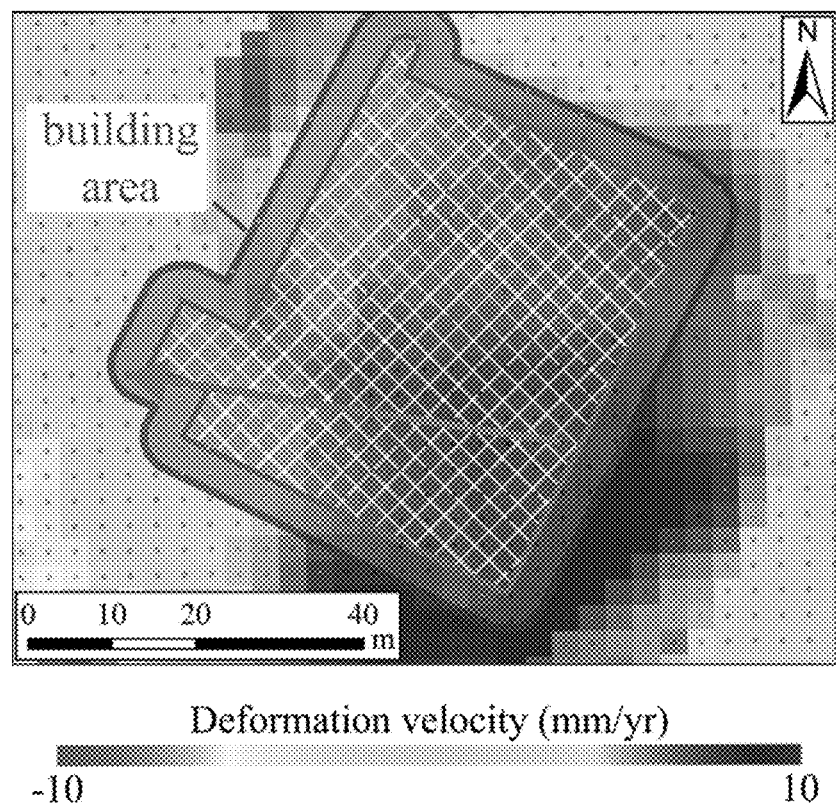
FIG. 2B is a deformation velocity diagram after Kriging interpolation in the embodiment of the present application.
Figure 2C:
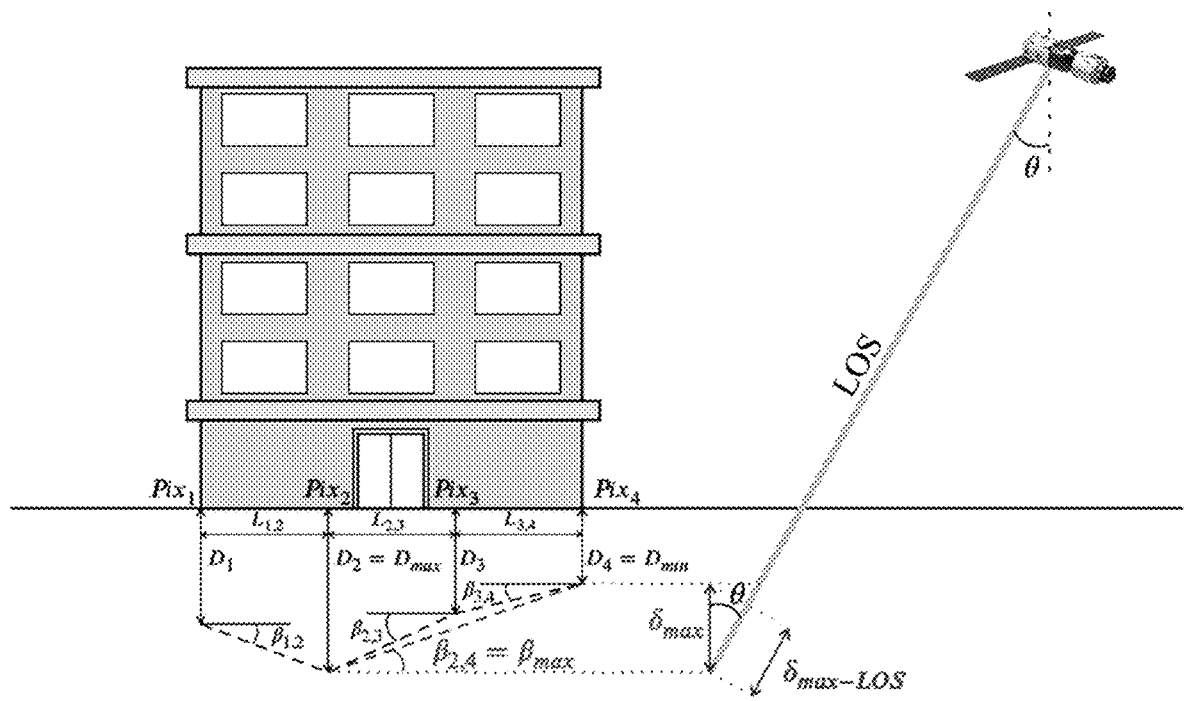
FIG. 2C is a schematic diagram of building risk assessment parameters in the embodiment of the present application.

When the most stable PS point has been determined, other PS points and all DS points may be found through the second-layer network. Homogeneous filtering method is used to reconstruct the interference phase for DS point monitoring. Broyden-Fletcher-Goldfarb-Shanno algorithm used for optimization in SqueeSAR assumes that the covariance matrix is positive definite. However, when the number of homogeneous pixels is less than N, this is not always the case. Therefore, phase optimization may be unreliable. In order to solve this problem, coherent weighted phase link (CWPL) is used to reconstruct the phase. The CWPL method assigns greater weight to the phase with high coherence, assuming that higher coherence indicates higher image quality. Then, using the reconstructed optimal phase, whether a pixel is DS or not is identified by the time coherence threshold (for example, the threshold values of TerraSAR-X and COSMO-SkyMed are usually set to 0.68 and Sentinel-1 to 0.65). It is worth noting that the InSAR deformation estimate is in the direction of radar line of sight (LOS). The point at the top of a high-rise building may have horizontal deviation or vertical thermal expansion. In order to avoid the uncertainty, the height threshold is used to remove the points on the high-rise building, and only the measured values near the ground are kept for risk assessment. Then, the LOS deformation is transformed into vertical land subsidence by using the incident angle 1.2 Building Deformation Extraction and Risk Assessment Technology X-band satellite images (TerraSAR-X and COSMO-SkyMed) have high resolution, which may be directly applied to building deformation extraction and risk assessment. The improved MTInSAR technology may increase the density of monitoring points, and the risk areas may be identified according to the results, but compared with the deformation extraction of single-family buildings, the monitoring points are still sparse (FIG. 2A). In order to obtain the deformation indicators of the buildings, Kriging interpolation method is used to generate the deformation velocity into spatially continuous grid data (the grid resolution is set to 3 m), and its center point is extracted (as shown in FIG. 2B). The deformation extraction area may be set according to the building outline, and the buffer area here is set as the diagonal length of the grid unit, which is about 4.25 m (as shown in the building area in FIG. 2B). Through overlay extraction, the building inclination direction, annual minimum subsidence ($D_{min}$), maximum subsidence ($D_{max}$), differential subsidence ($\delta$) and angle distortion ($\beta$) may be obtained (as shown in FIG. 2C). In particular, the angle distortion refers to the radian value of the included angle between two differential subsidence points and the horizontal direction, which may be approximately calculated by dividing the differential subsidence value between two points by the horizontal distance between two points. According to FIG. 2C, it can be seen that the maximum angle distortion of a building may be calculated by the following formula:

$$\beta_{max} = \frac{|D_{max} - D_{min}|}{L} \quad (2)$$

where L refers to the horizontal distance between two points. Generally, the cumulative values of maximum subsidence and angle distortion are selected as the evaluation indicators for serviceability limit state (SLS) of buildings. Due to the lack of historical data, the accurate cumulative values cannot be obtained. In this assessment scheme, the annual average change is selected as the evaluation indicator, which not only ensures the accuracy of assessment, but also may evaluate the annual data and observe the risk changes of buildings. For example, for an experimental area, it is suggested that the allowable cumulative subsidence and angle distortion values may not exceed 92 mm and 0.0031 rad, and the maximum subsidence velocity and differential subsidence velocity may not exceed 4 mm/yr and 2 mm/yr, otherwise, it is considered that the building risk level has reached high risk. Then the building risk assessment indicator may be specified according to the expected risk level, and the example table of building risk level classification indicator is shown in Table 1.

TABLE 1

| Building risk level | Maximum subsidence velocity/$D_{max}$ (mm/yr) | Angle distortion velocity/$\beta_{max}$ (rad/yr) |
|---|---|---|
| Negligible (N) | ≤ 2.0 | — |
| Negligible to medium (N2M) | 2.0-5.0 | — |
| Medium (M) | 5.0-10 | — |
| Medium to high (M2H) | >10 | ≤0.0003 |
| High (H) | >10 | >0.0003 |

1.3 Finite Element Numerical Simulation Technology Based on Stress-Pore Water Pressure Model The fusion of multi-channel satellite image measurement results may obtain the long time series of the research object as the input of numerical simulation, and verify the correctness of the soil mechanical parameters input by numerical simulation. What needs to be specially explained here is that the multi-channel satellite image time series fusion extracts the time series of the homologous image points. If the monitoring points obtained by different images are the closest in space and the distance is less than 10 m, they are regarded as the homologous image points. Finite element analysis is carried out with the help of GeoStudio, a soil mechanical simulation software, in which Sigma/W analysis module may simulate bottom deformation, Seep/W module may simulate pore water pressure caused by stress state change, and coupled analysis of the two modules may analyze stress-pore water pressure. In the finite element model, the direct cause of ground deformation comes from the effective stress ($\sigma'_v$), and due to the need to consider the size of pore water pressure, the effective stress may be expressed as:

$$\sigma'_v = \sigma_v - u \quad (3)$$

where u is the pore water pressure and $\sigma_v$ is the total stress. The total stress depends on the total unit weight of the soil above and any load surface load. The total stress may be expressed as:

$$\sigma_v = \sum_i^n \gamma_i Z_i \quad (4)$$

where Z is the thickness of each soil material layer, $\gamma$ is the unit weight of each soil material, and i and n are the corresponding serial numbers and total number of soil materials. As shown in FIG. 1, two variables are introduced, which respectively represent the groundwater level change and the external force change, and they are both time-related functions. The decrease of groundwater level is caused by pumping water during the tunnel or foundation construction. After the construction, the water level gradually rises, which is caused by the natural recovery of water level or artificial water replenishment, which changes the value of pore water pressure u. Therefore, the change of water level needs to define the start, inflection point and end time of the function according to the construction progress. The external force change is mainly caused by new buildings, which will be defined as a linear function. The slope of this function depends on the construction velocity. Before prediction and simulation, it is necessary to confirm the effectiveness of various parameters of soil mechanical according to high-resolution X-band satellite images. At first, common values or empirical reference values are input according to the geological conditions of the research area. By comparing the deformation time series of simulation results with the multi-channel InSAR time series results, an optimal parameter system is obtained, and then the building risk level is predicted by changing the water level and external force conditions.

2. Verify the Experimental Area and Data

Hong Kong and Shenzhen are two highly urbanized cities in Central South China, with a population of about 7.4 million and 17.5 million respectively. The two cities are located in the subtropical zone, which is characterized by cloudy and rainy weather. Two areas which are prone to land subsidence and frequently constructed, Kowloon District of Hong Kong and Futian District of Shenzhen, are selected as the method verification areas, as shown in FIG. 3 A and FIG. 3 B.

2.1 Kowloon District of Hong Kong and the Construction Situation

Figure 3A:
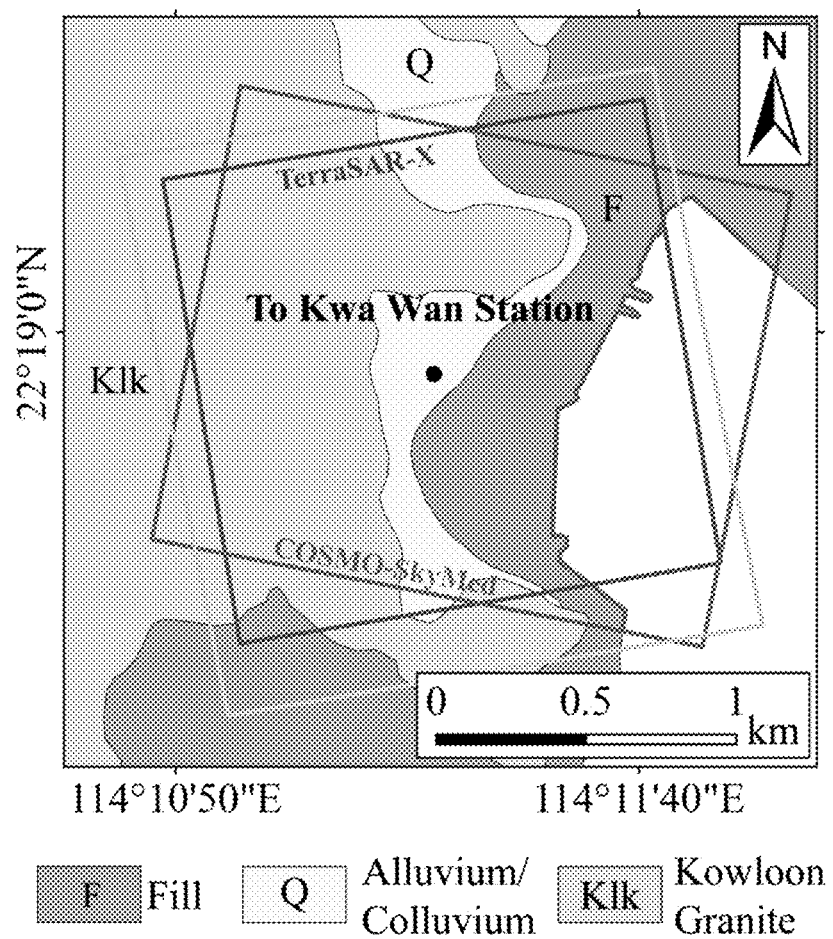
FIG. 3A is a geological map of Kowloon District of Hong Kong in the embodiment of the present application.

This area is located in the east of Kowloon District of Hong Kong, with a spatial coverage of 6 km$^2$. The geological soil consists of Kowloon granite, alluvium and fill. Alluvium are Quaternary, while Kowloon granite is Cretaceous. Geological map shows that this area is backed by Hewentian Mountain, which was a major granite quarry before 1960s, and Matouwei reclamation area is in the east, which was reclaimed five times from 1904 to 1986. There are several river valleys at the foot of the mountain, and rivers wash away rocks, leaving a lot of "alluvium". Therefore, the surface around Matouwei Road is alluvium, which contains a lot of groundwater (as shown in FIG. 3A). To Kwa Wan Station is a subway station located at Matouwei Road, between Leshan Road and Jiangsu Street. It is a three-story deep underground station with concrete structure. The tunnel project of To Kwa Wan Station started in January 2013 and was completed in December 2016. According to reports, due to the underground construction of To Kwa Wan Station, 23 buildings experienced excessive subsidence in 2018.

2.2 Futian District of Shenzhen and the Onstruction Situation

Figure 3B:
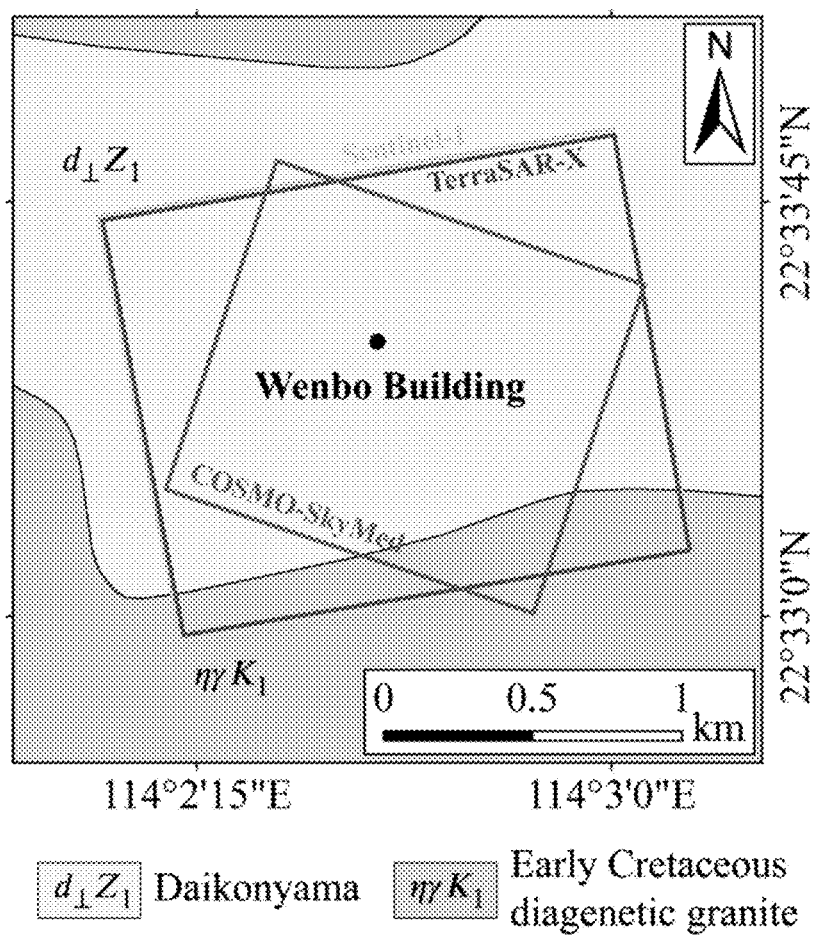
FIG. 3B shows the geological map of Futian District of Shenzhen in the embodiment of the present application.
Figure 4A:
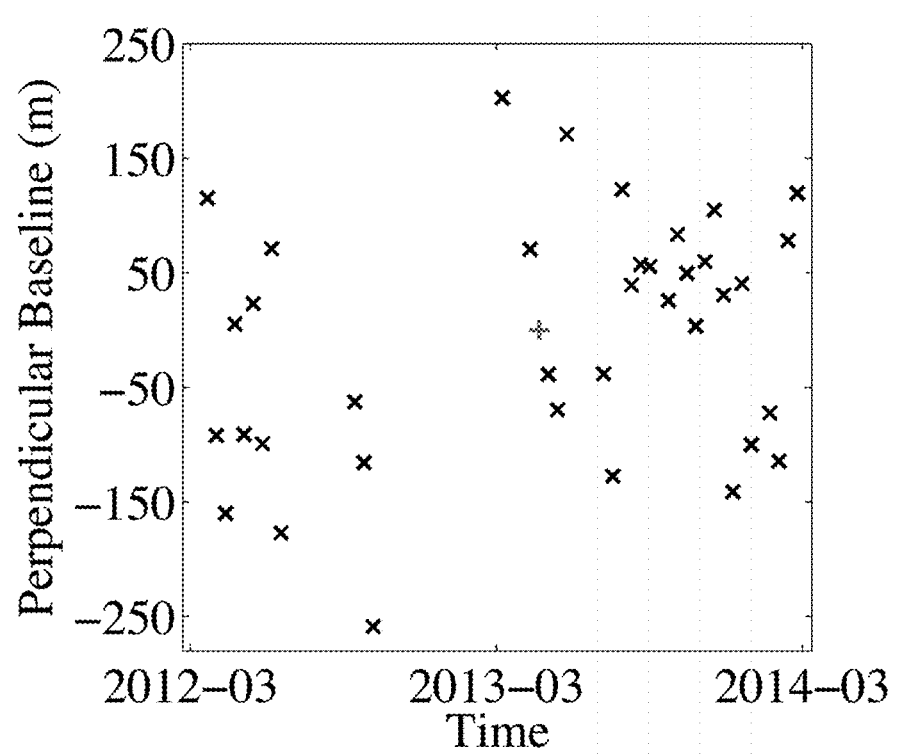
FIG. 4A is an image spatio-temporal baseline diagram of TerraSAR-X for Kowloon District.
Figure 4B:
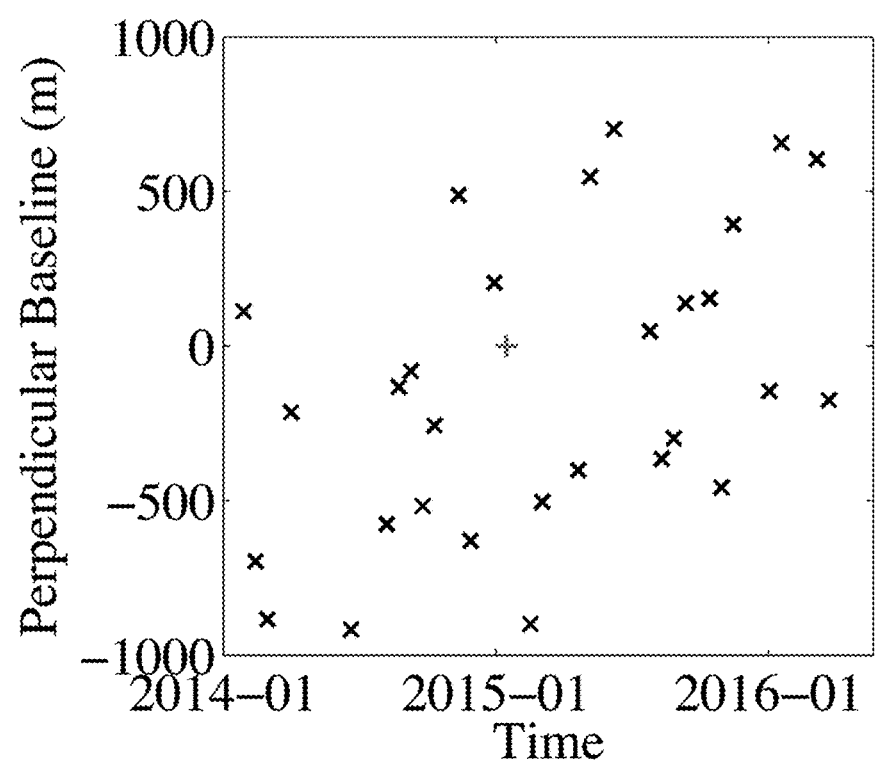
FIG. 4B is an image spatio-temporal baseline diagram of COSMO-SkyMed for Kowloon District.
Figure 4C:
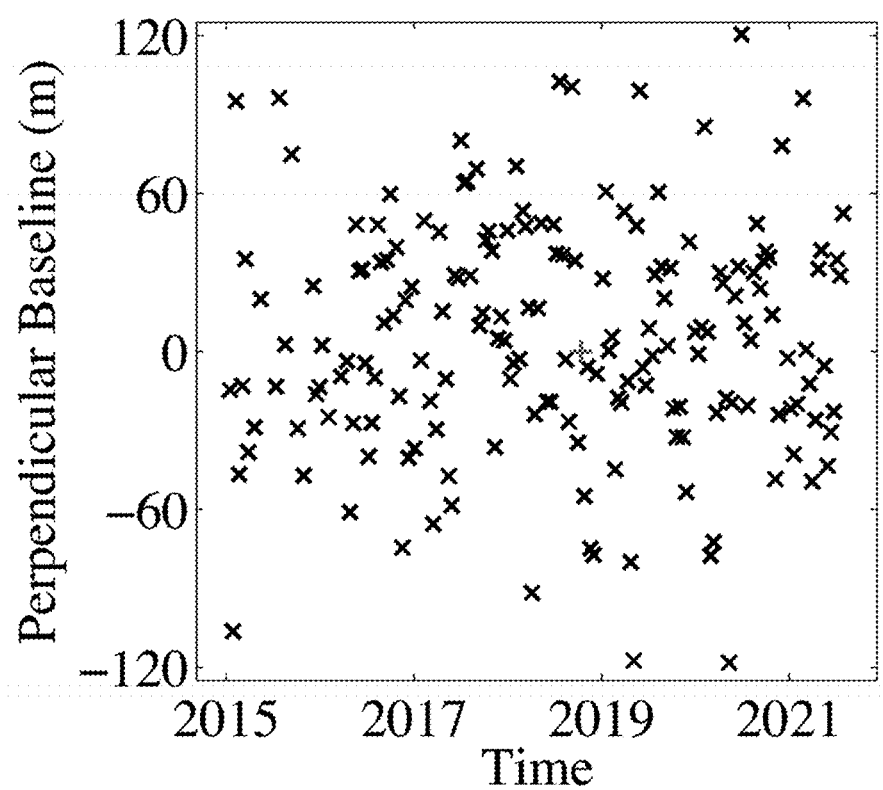
FIG. 4C is an image spatio-temporal baseline diagram of Sentinel-1 for Kowloon District.
Figure 4D:
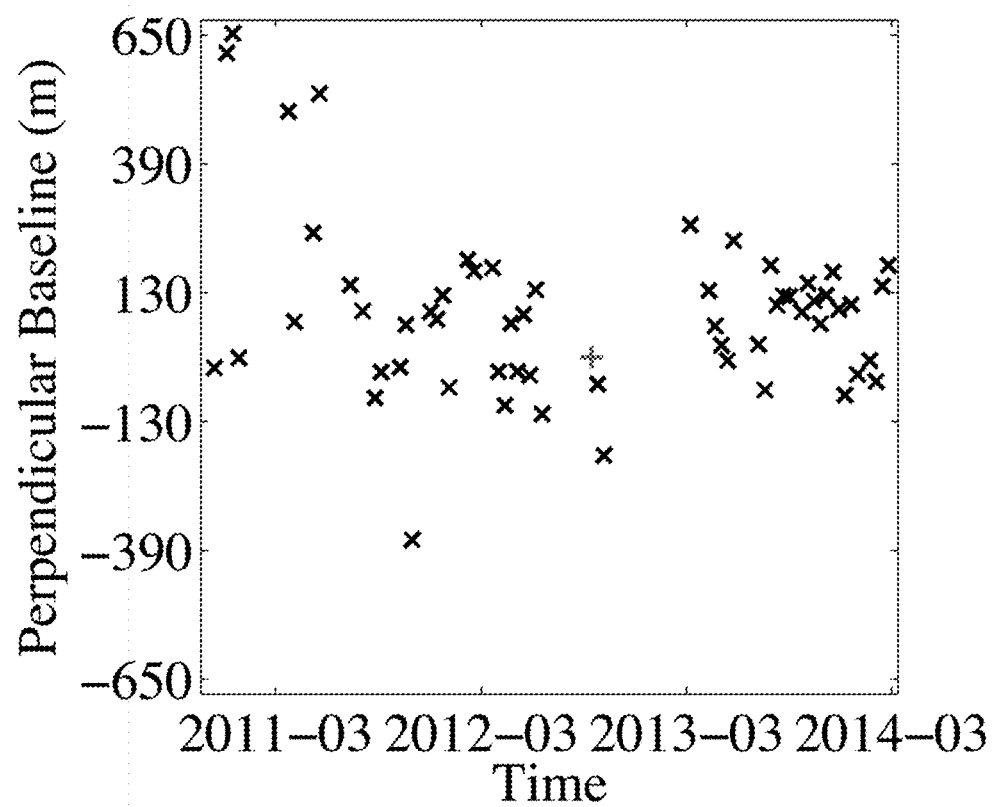
FIG. 4D is an image spatio-temporal baseline diagram of TerraSAR-X for Futian District.
Figure 4E:
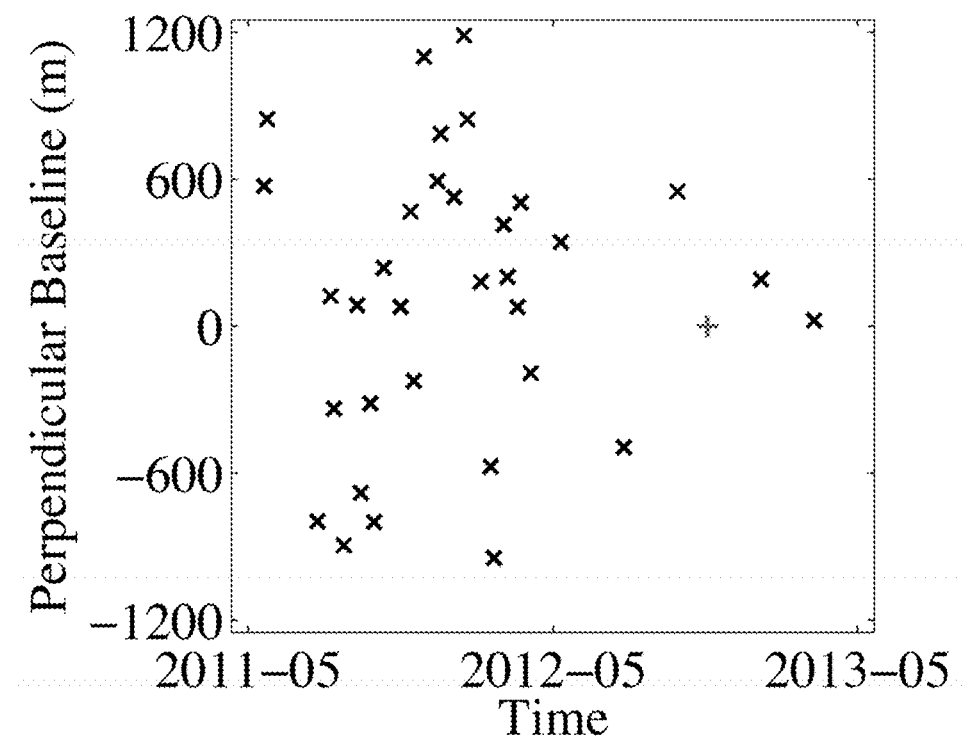
FIG. 4E is an image spatio-temporal baseline diagram of COSMO-SkyMed for Futian District.
Figure 4F:
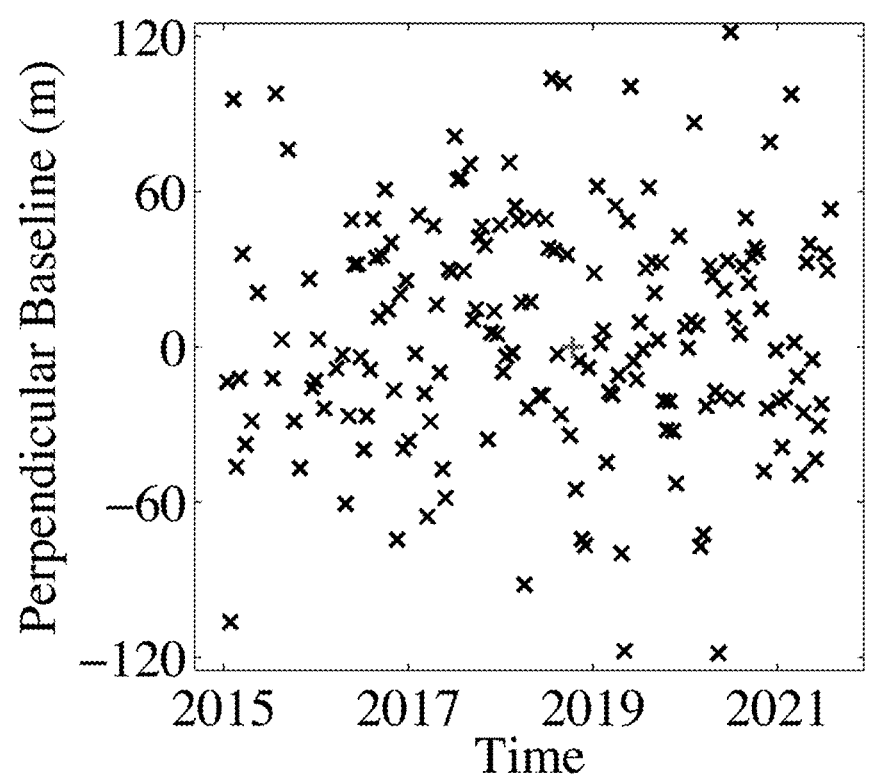
FIG. 4F is an image spatio-temporal baseline diagram of Sentinel-1 for Futian District.

Futian District is located in the middle of Shenzhen, and the spatial coverage of the research area is about 2.5 km$^2$ (FIG. 3B). The oldest stratum exposed in Futian District is Hubeishan migmatite (Chh) in the Great Wall Period of Middle Paleozoic, which is distributed along the line from Meilin to Bijiashan. Wenbo Building is located in the southwest corner of the intersection of Xinzhou Road and Lianhua Road. Its total height is 208 m, with 56 floors, including 45 floors above ground. The excavation of Wenbo Building began in April 2012 and was completed in May 2013. The main building was completed in November 2016. In March 2013, a sinkhole collapsed next to Wenbo Building due to foundation excavation. The formation below Wenbo Building is Daikanyama Formation, which is mainly composed of quartz mica schist, mica quartz schist, quartzite mixed with carbonaceous mica rock, siliceous rock, tuff and pyrite layer.

2.3 SAR Data

This embodiment uses high-resolution (3 m×3 m)TerraSAR-X and COSMO-SkyMed data and medium-resolution (5 m×20 m)Sentinel-1 satellite images. TerraSAR-X and COSMO-SkyMed satellites are X-band channels with a wavelength of 3.1 cm, while Sentinel-1 is a C-band channel with a wavelength of 5.6 cm. The data to be used in this verification experiment include 39 ascending TerraSAR-X images obtained from March 2012 to March 2014, and 30 descending COSMO-SkyMed images obtained from January 2014 to March 2016, which are used to monitor Kowloon District. 60 ascending TerraSAR-X images obtained from November 2010 to March 2014 and 34 descending COSMO-SkyMed images obtained from May 2011 to March 2013 will be used to monitor the situation in Futian District. From June 2015 to December 2021, a total of 175 ascending Sentinel-1 images covering two research areas were collected to verify the predicted deformation. The spatial and temporal baselines of the satellites used are shown in FIG. 4A, FIG. 4B, FIG. 4C, FIG. 4D, FIG. 4E and FIG. 4F and the details of SAR data are shown in Table 2.

TABLE 2

| Research areas | Satellites | Rail | Time span | Number of images |
|---|---|---|---|---|
| Kowloon District of Hong Kong | TerraSAR-X | Ascending | 21 Mar. 2012- 28 Mar. 2014 | 39 |
| | COSMO-SkyMed | Descending | 28 Jan. 2014- 22 Mar. 2016 | 30 |
| | Sentinel-1 | Ascending | 15 Jun. 2015- 28 Dec. 2021 | 175 |
| Futian District of Shenzhen | TerraSAR-X | Ascending | 12 Nov. 2010- 28 Mar. 2014 | 60 |
| | COSMO-SkyMed | Descending | 20 May 2011- 10 Mar. 2013 | 34 |
| | Sentinel-1 | Ascending | 15 Jun. 2015- 28 Dec. 2021 | 175 |

3 Method Verification 3.1 InSAR Measurement Results and Accuracy Verification

Figure 5A:
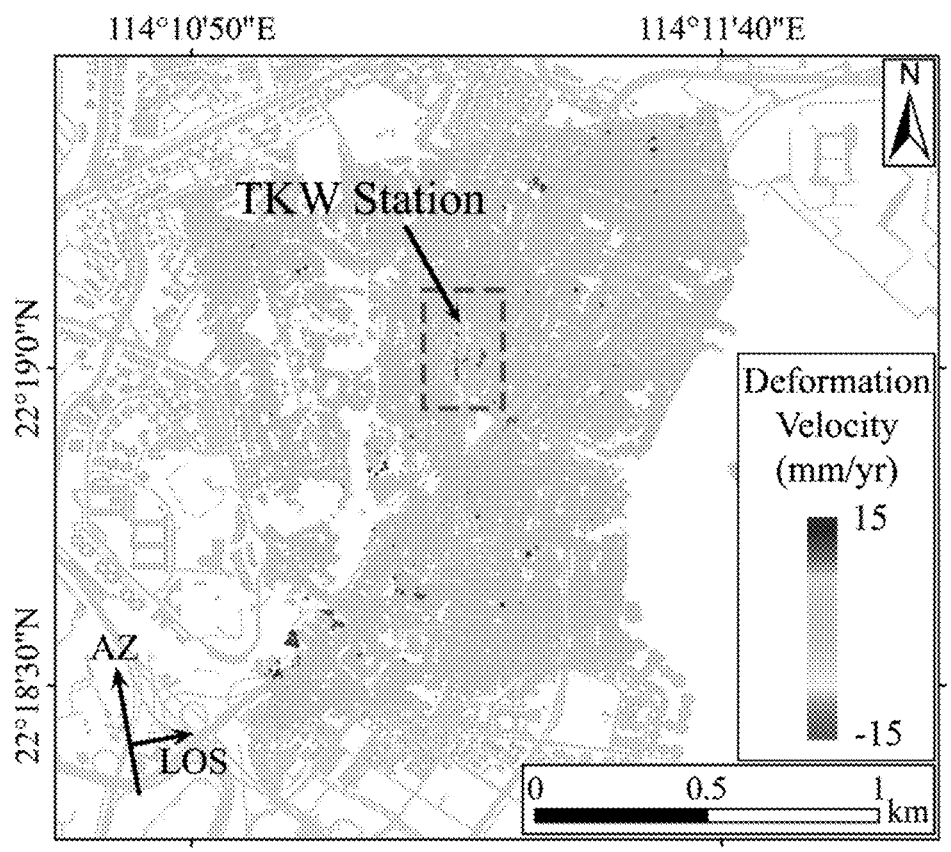
FIG. 5A is TerraSAR-X monitoring velocity result for Kowloon District of Hong Kong.
Figure 5B:
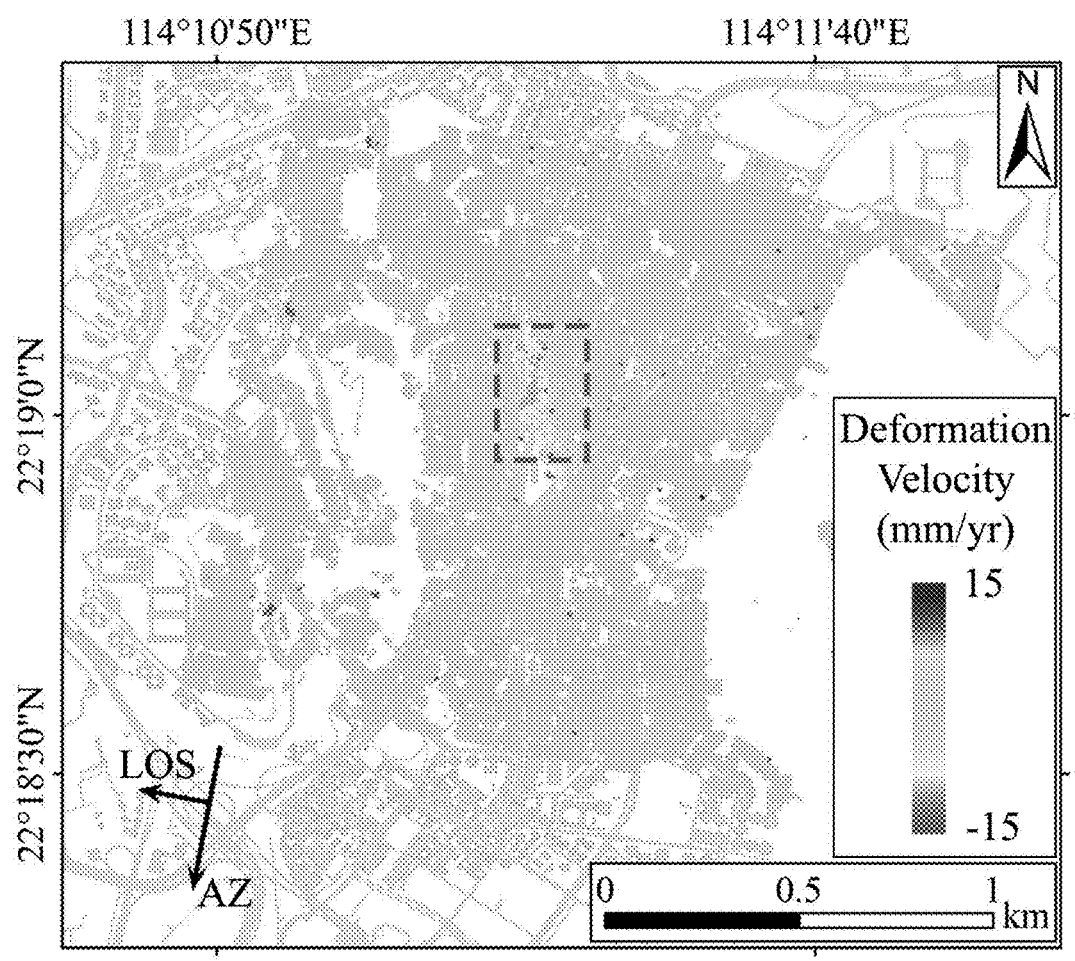
FIG. 5B is COSMO-SkyMed monitoring velocity result for Kowloon District of Hong Kong.
Figure 5C:
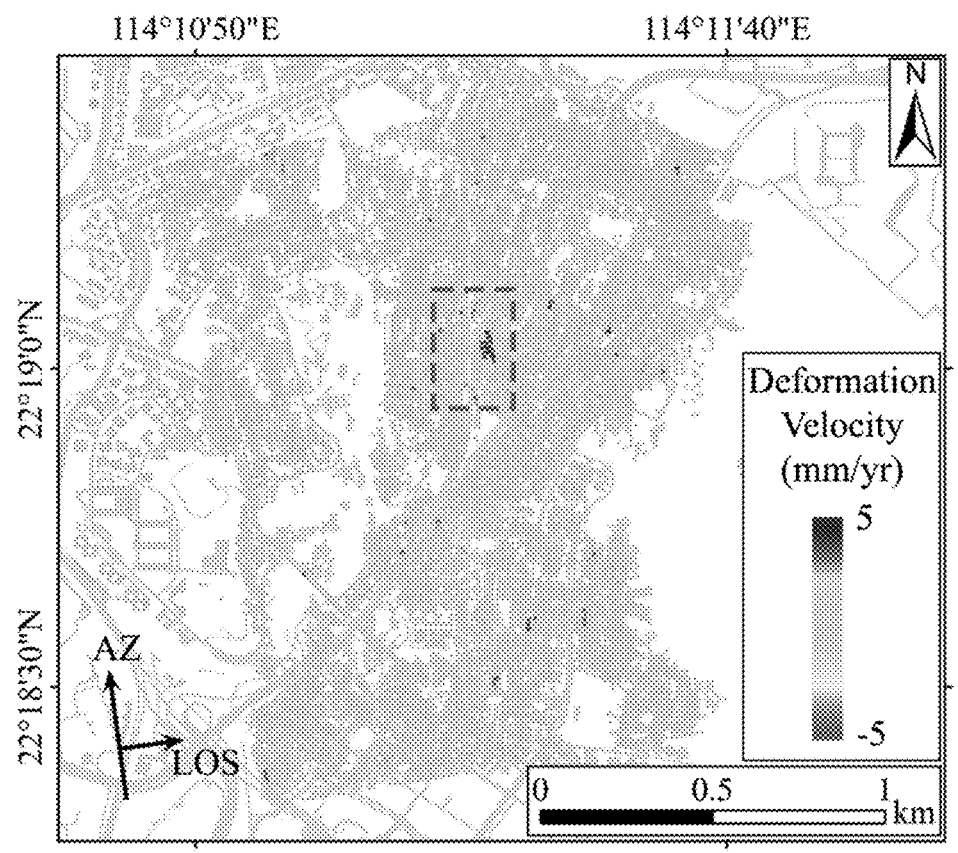
FIG. 5C is Sentinel-1 monitoring velocity result of Kowloon District of Hong Kong.
Figure 5D:
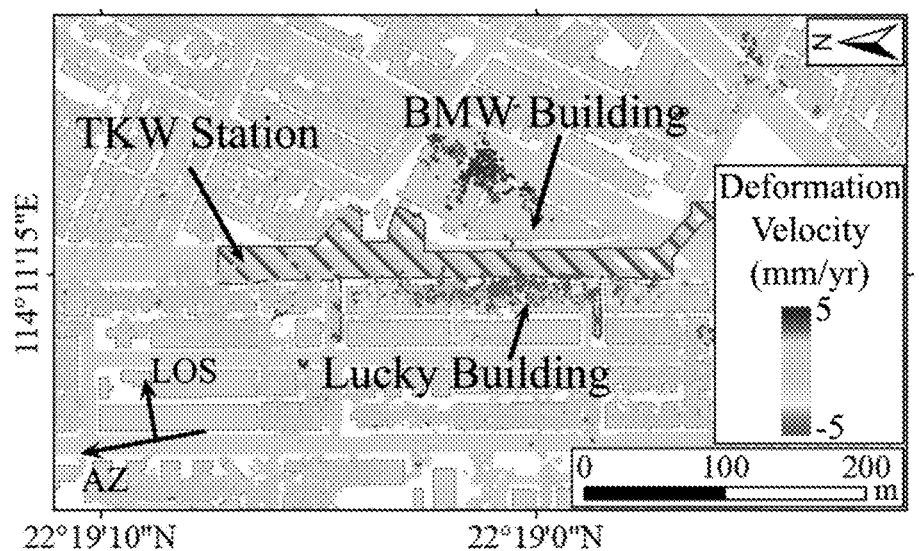
FIG. 5D is an enlarged diagram of the monitoring results of the dashed box in the FIG. 5A.
Figure 5E:
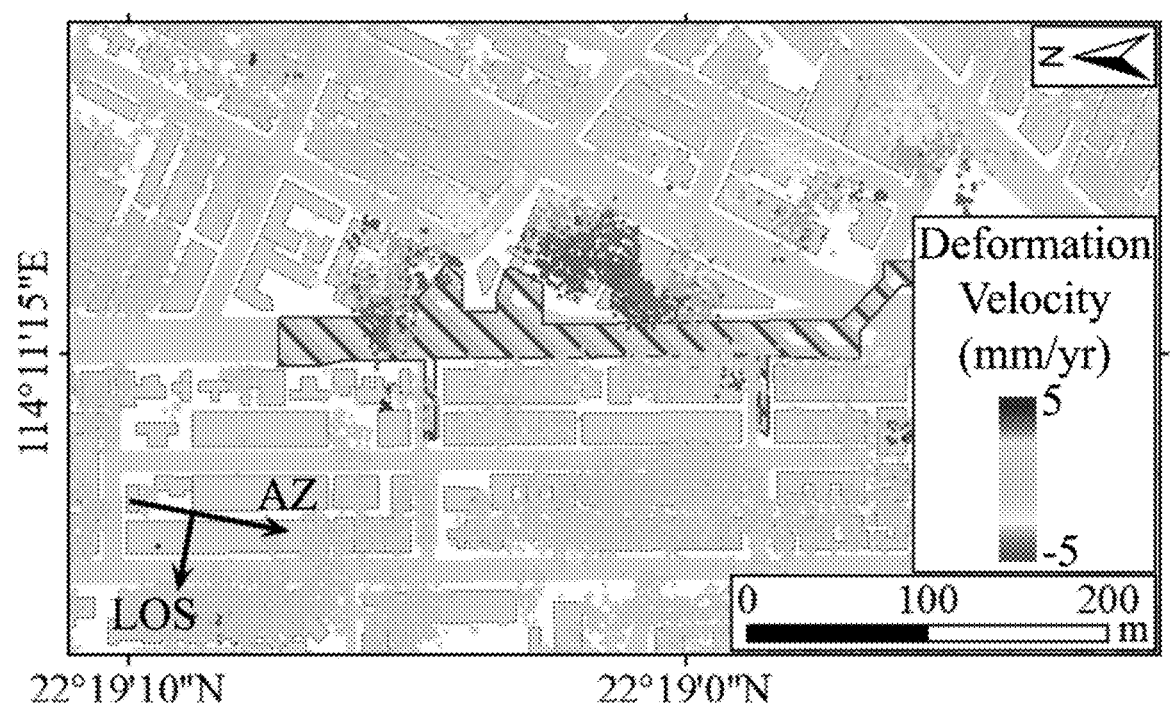
FIG. 5E is an enlarged diagram of the monitoring results of the dashed box in the FIG. 5B.
Figure 5F:
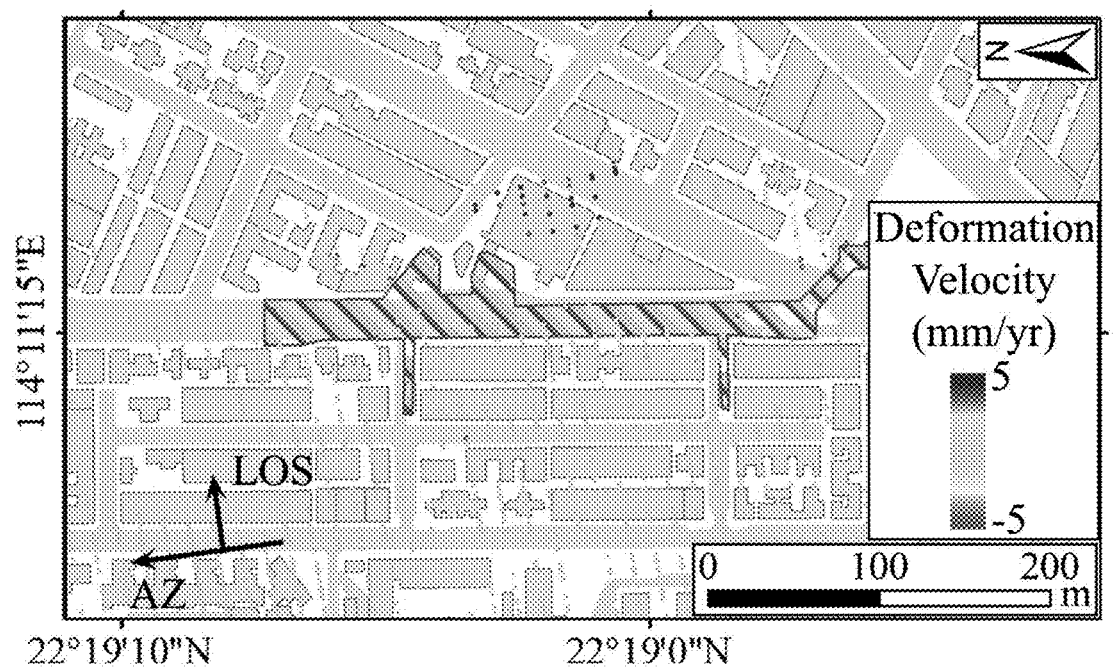
FIG. 5F is an enlarged diagram of the monitoring results of the dashed box in the FIG. 5C.
Figure 6A:
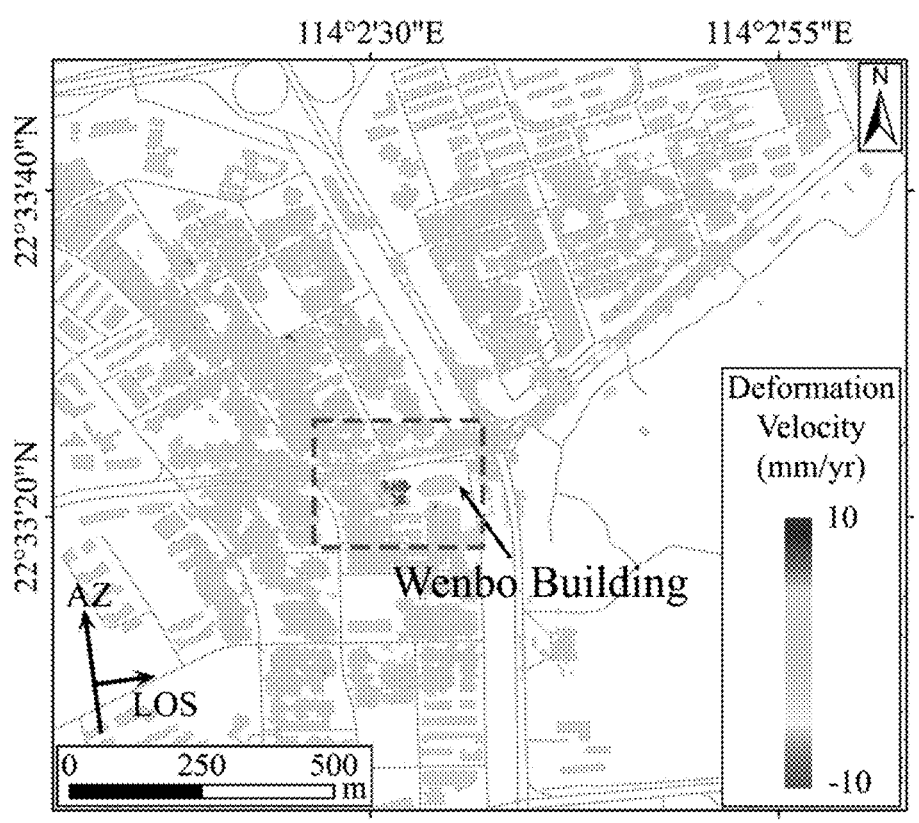
FIG. 6A is a TerraSAR-X monitoring diagram of InSAR monitoring results in Futian District of Shenzhen.
Figure 6B:
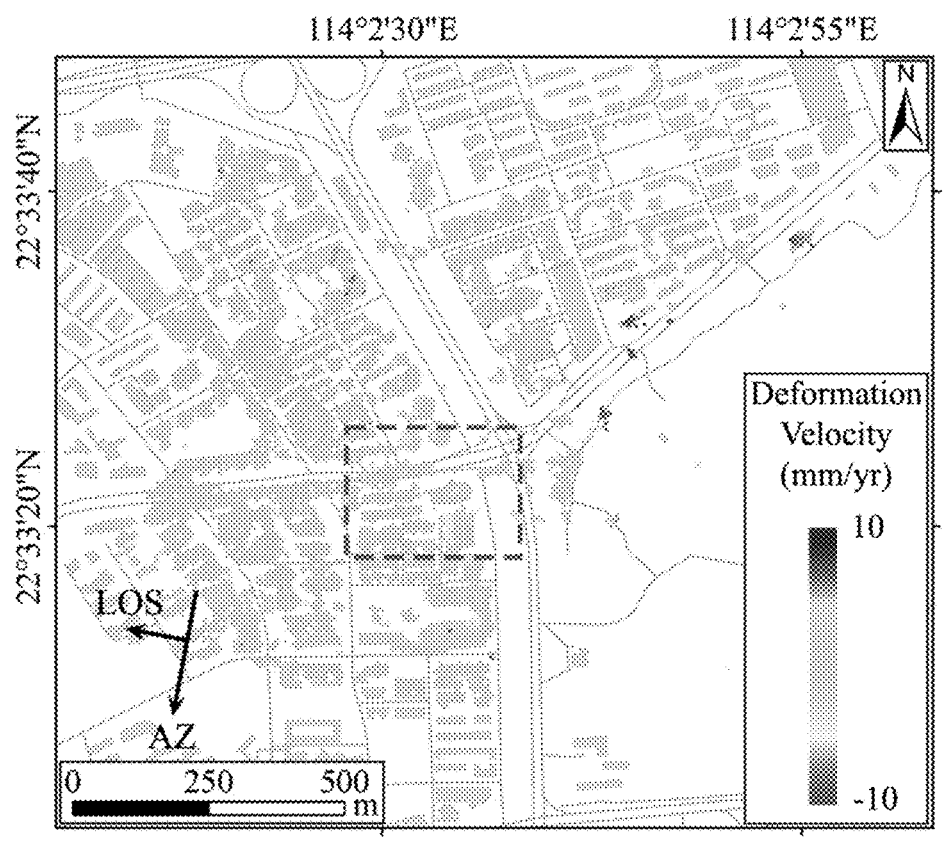
FIG. 6B is a COSMO-SkyMed monitoring diagram of InSAR monitoring results in Futian District of Shenzhen.
Figure 6C:
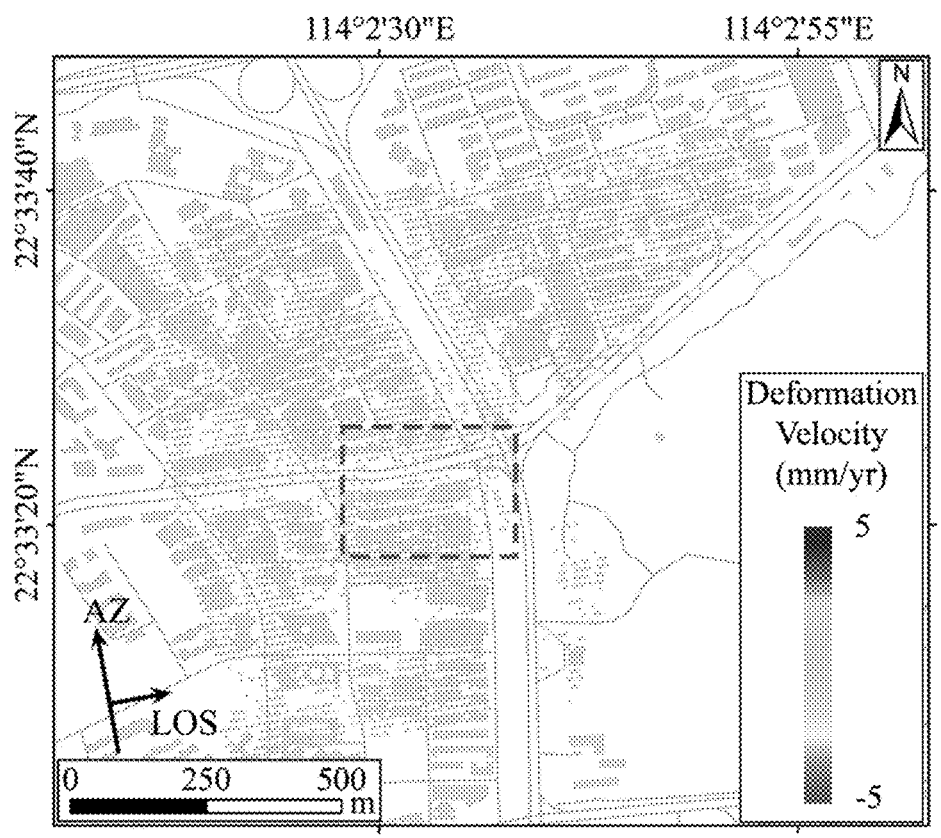
FIG. 6C is a Sentinel 1 monitoring diagram of InSAR monitoring results in Futian District of Shenzhen.
Figure 6D:
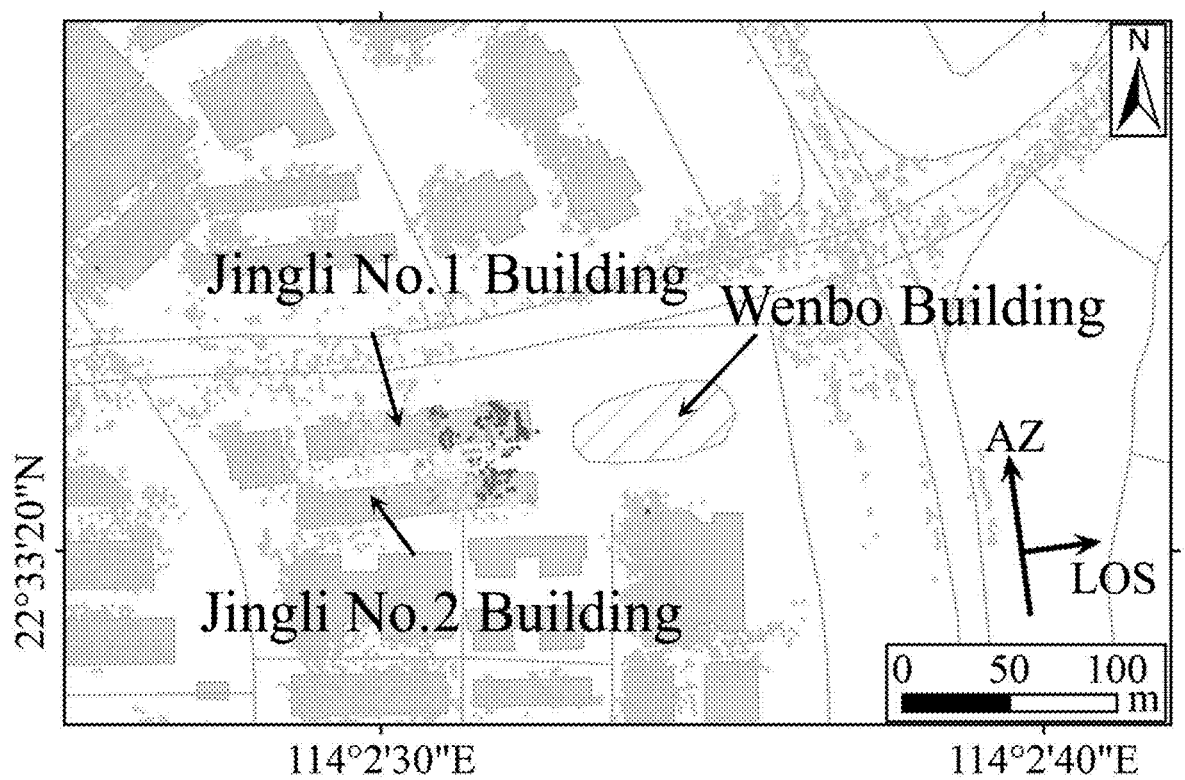
FIG. 6D is an enlarged diagram of the results in the neighborhood of Wenbo Building of the dashed box in the FIG. 6A.
Figure 6E:
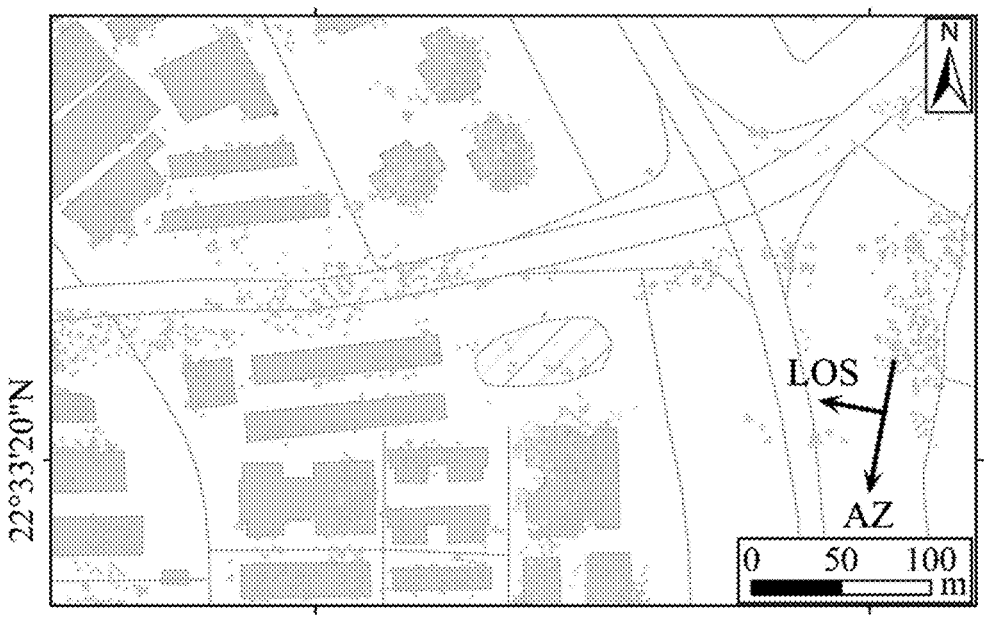
FIG. 6E is an enlarged diagram of the results in the neighborhood of Wenbo Building of the dashed box in the FIG. 6B.
Figure 6F:
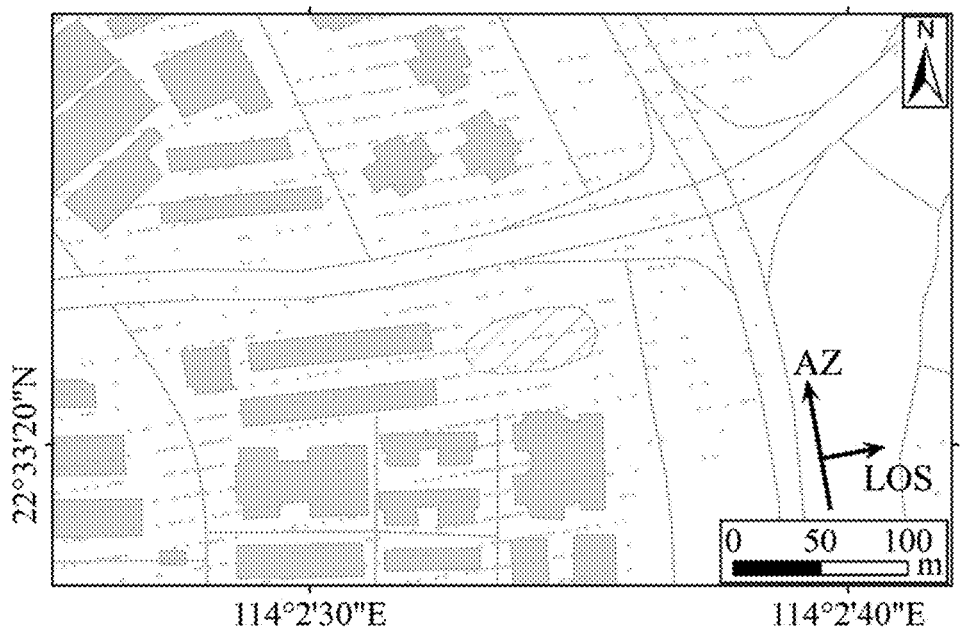
FIG. 6F is an enlarged diagram of the results in the neighborhood of Wenbo Building of the dashed box in the FIG. 6C.
Figure 7A:
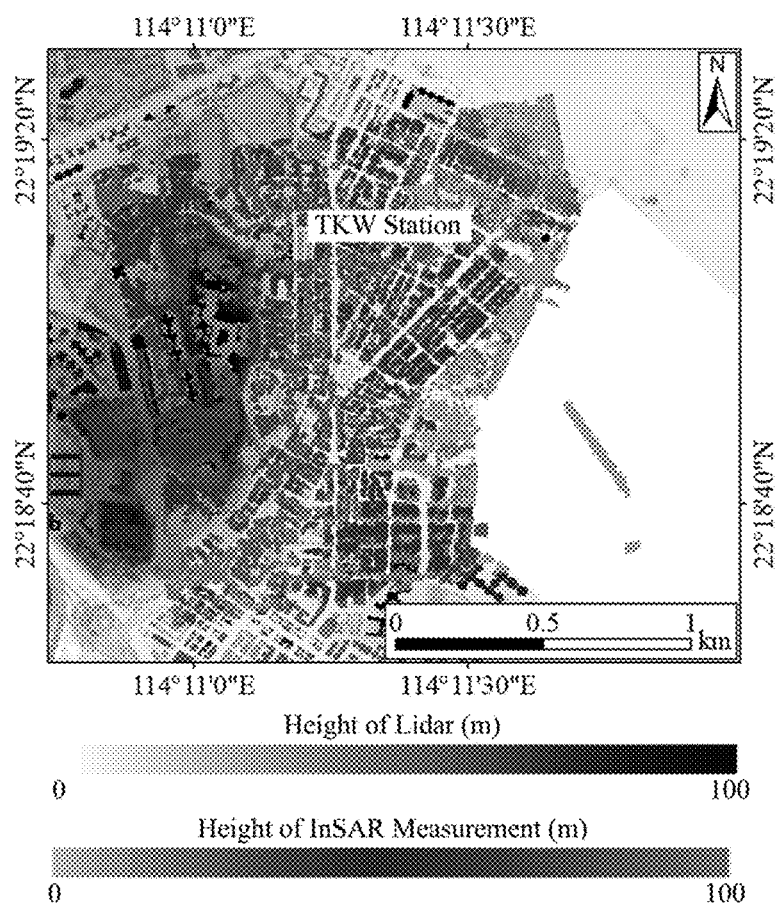
FIG. 7A is TerraSAR-X of height assessment diagram of Kowloon District in Hong Kong in the embodiment of the present application.
Figure 7B:
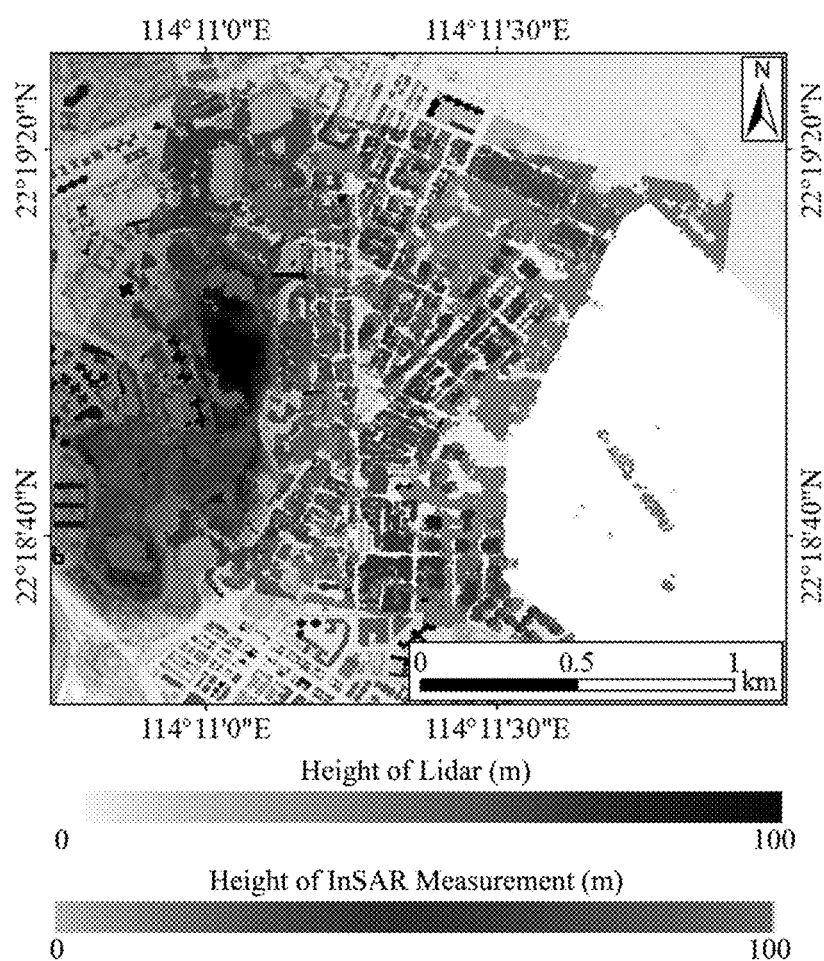
FIG. 7B is COSMO-SkyMed of height assessment diagram of Kowloon District in Hong Kong in the embodiment of the present application.
Figure 7C:
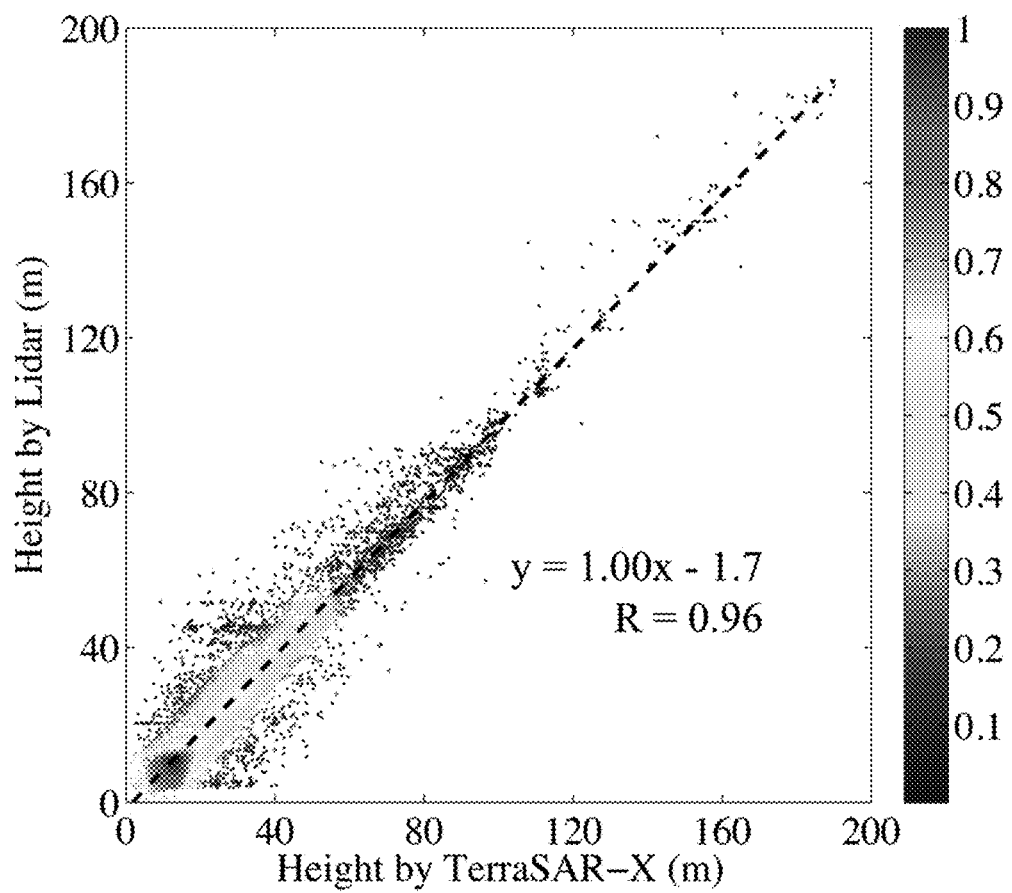
FIG. 7C is a thermal diagram of comparison between InSAR height assessment from TerraSAR-X result and LiDAR data.
Figure 7D:
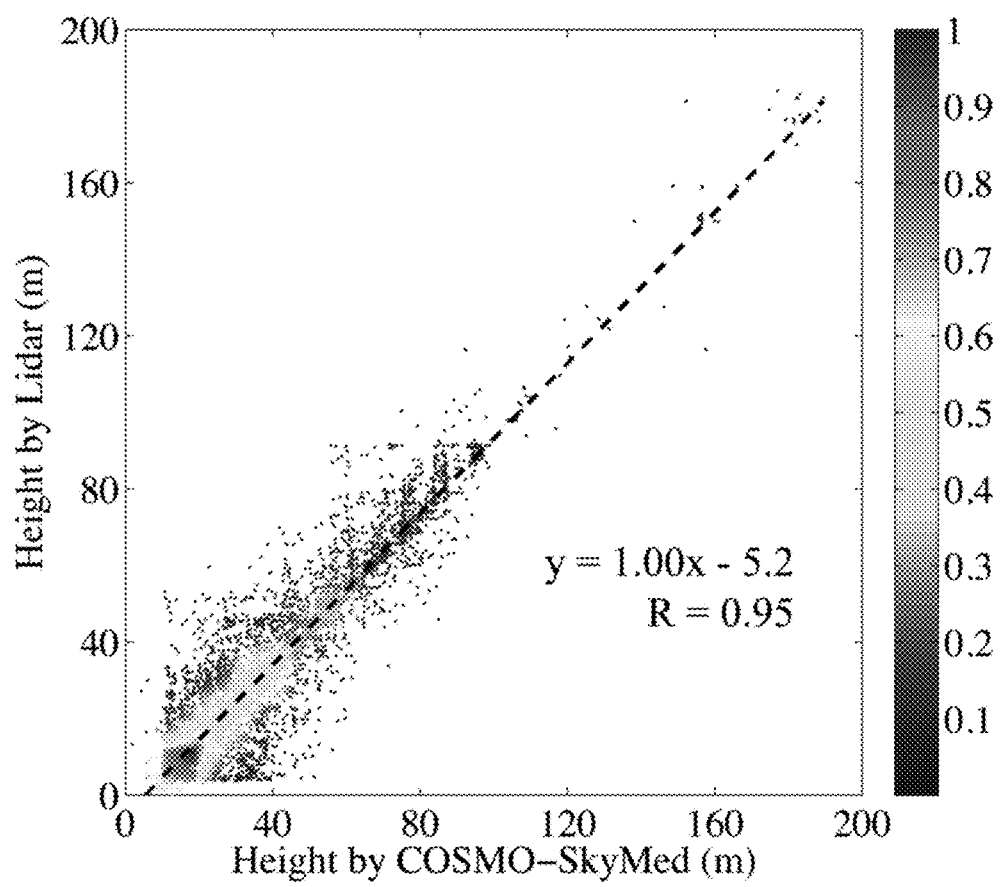
FIG. 7D is a thermal diagram of comparison between InSAR height assessment from COSMO-SkyMed result and LiDAR data.

FIG. 5A, FIG. 5B, FIG. 5C, FIG. 5D, FIG. 5E and FIG. 5F show the deformation velocity maps in LOS direction in Kowloon District of Hong Kong. The positive velocity indicates that the deformation of the scattering point moves towards the satellite along the LOS direction, which may be caused by the ground uplift or the large horizontal movement of the building towards the satellite, while the negative velocity moves away from the satellite, which may be caused by the land subsidence or the large horizontal movement away from the satellite. The deformation velocities obtained from TerraSAR-X, COSMO-SkyMed and Sentinel-1 are −25.3-20.2, −19.5-13.2, 5.1-7.8 mm/yr, respectively. Assuming that the points with absolute velocity less than 2 mm/yr are stable, the unstable points account for 22.8%, 13.3% and 3.1% of the total number of points in TerraSAR-X, COSMO-SkyMed and Sentinel-1 results, respectively. According to the InSAR results in Kowloon District of Hong Kong, there are many unstable points near To Kwa Wan (as shown in FIG. 5D, FIG. 5E and FIG. 5F), and the two sides show different subsidence directions. Due to the different incident directions of satellite radar, the velocity direction of TerraSAR-X monitoring results is just opposite to that of COSMO-SkyMed monitoring results, but both indicate that both sides of the construction area are inclined inward. This is caused by differential subsidence. With the subway tunnel as the central axis, the subsidence decreases to both sides, so the scattering points on the west side of subway construction show the phenomenon of moving to the east, and the scattering points on the east side of subway construction show the phenomenon of moving to the west. From the InSAR monitoring data, it can be seen that the two buildings in this research area that are seriously affected by construction are BMW Building and Lucky Building, which are just located on the east and west sides of the subway line, and the connected longitudinal sections are perpendicular to the subway line.

FIG. 6A, FIG. 6B, FIG. 6C, FIG. 6D, FIG. 6E and FIG. 6F show the LOS deformation velocities of Futian District in TerraSAR-X, COSMO-SkyMed and Sentinel-1 images. In the results of TerraSAR-X, COSMO-SkyMed and Sentinel-1, the deformation velocities are −14.1-7.7, −16.5-6.9, −4.9-3.3 mm/year respectively, and the moving points account for 4.7%, 12.6% and 2.1% of the total number of points respectively. There are no measuring points in the foundation pit of Wenbo Building, because during the monitoring period, the excavation work is going on, which leads to the decrelation effect. In the enlarged drawing (FIG. 6D), it is observed that Jingli No. 1 Building and Jingli No. 2 Building adjacent to the excavation project have suffered serious subsidence. In the results of TerraSAR-X and COSMO-SkyMed, the maximum LOS deformation velocity reaches −13.7 and −9.3 mm/year. Since the construction project was completed in 2016, the deformation measured from Sentinel-1 images in 2015-2021 is relatively small.

Figure 8A:
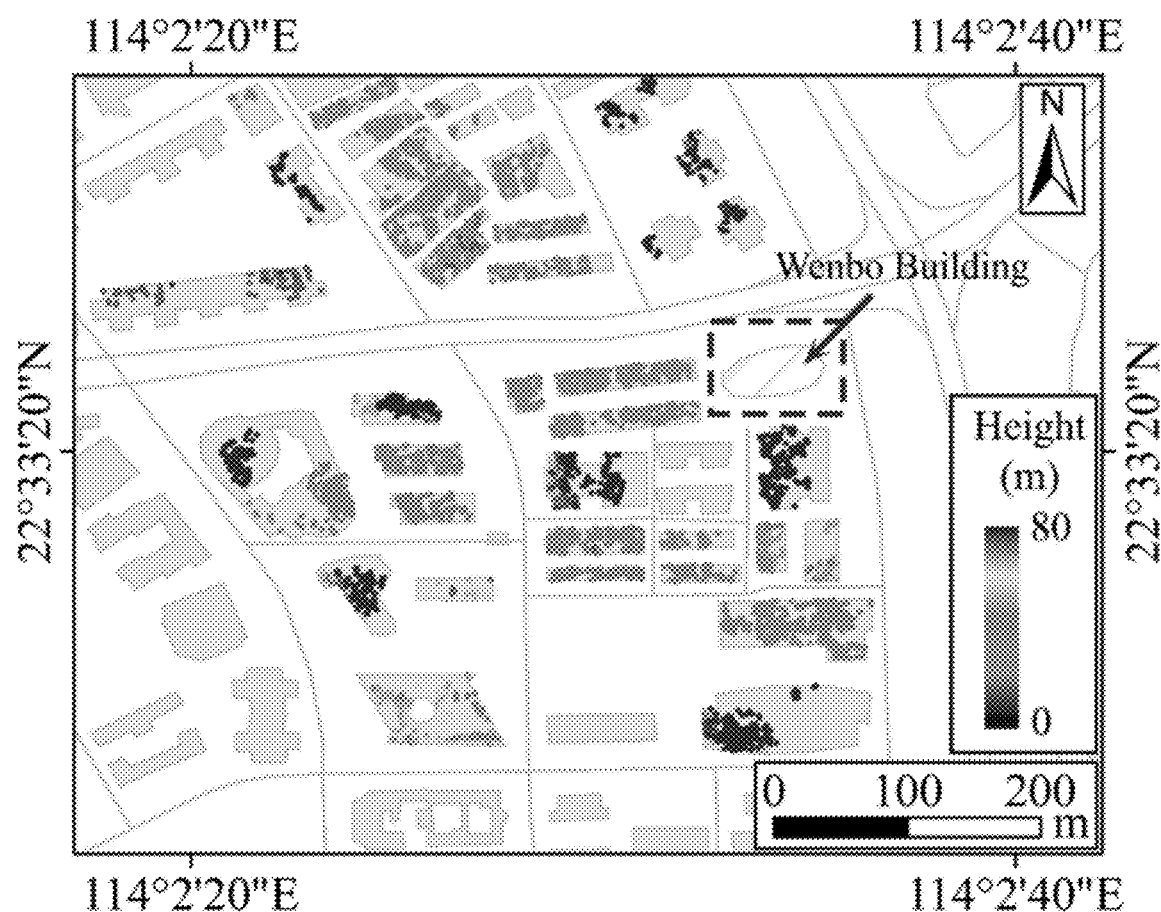
FIG. 8A is the height distribution of TerraSAR-X result around Wenbo Building in the embodiment of the present application.
Figure 8B:
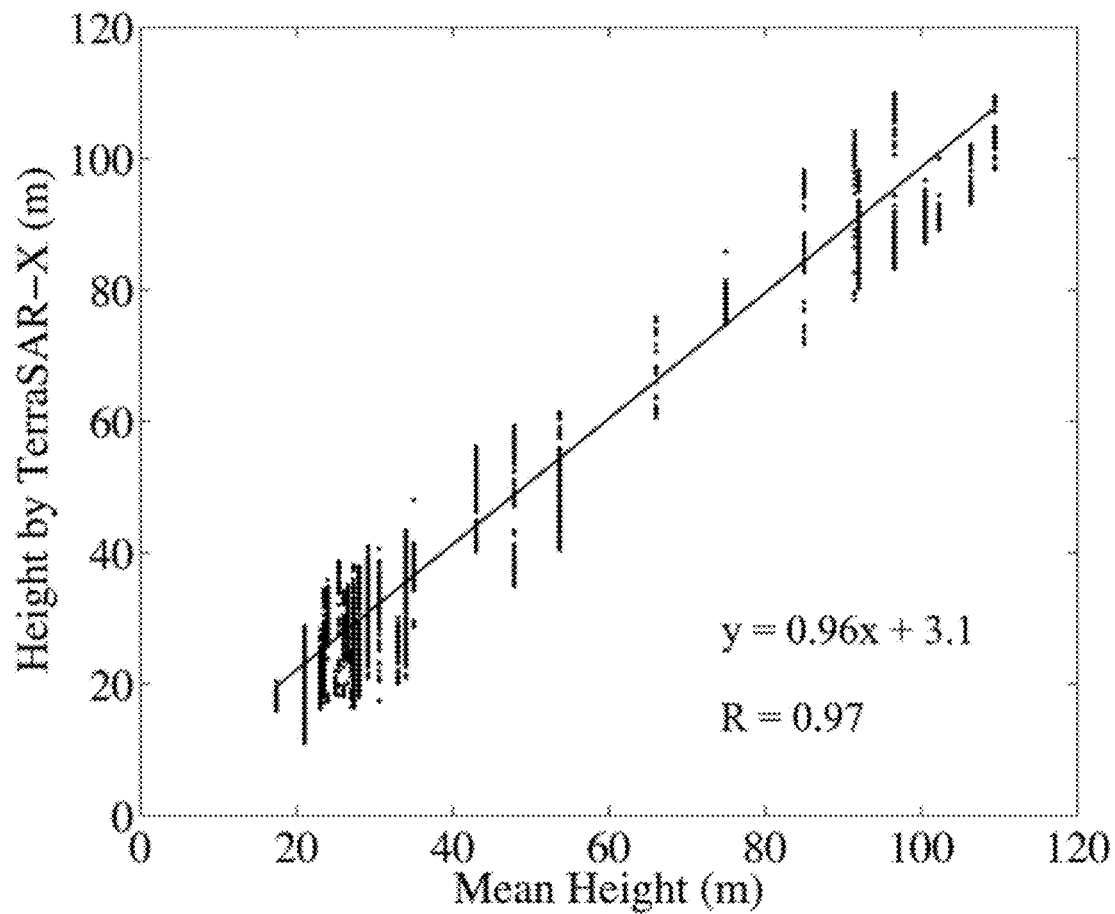
FIG. 8B is a comparison diagram of TerraSAR-X assessed height and real height in the embodiment of the present application.
Figure 8C:
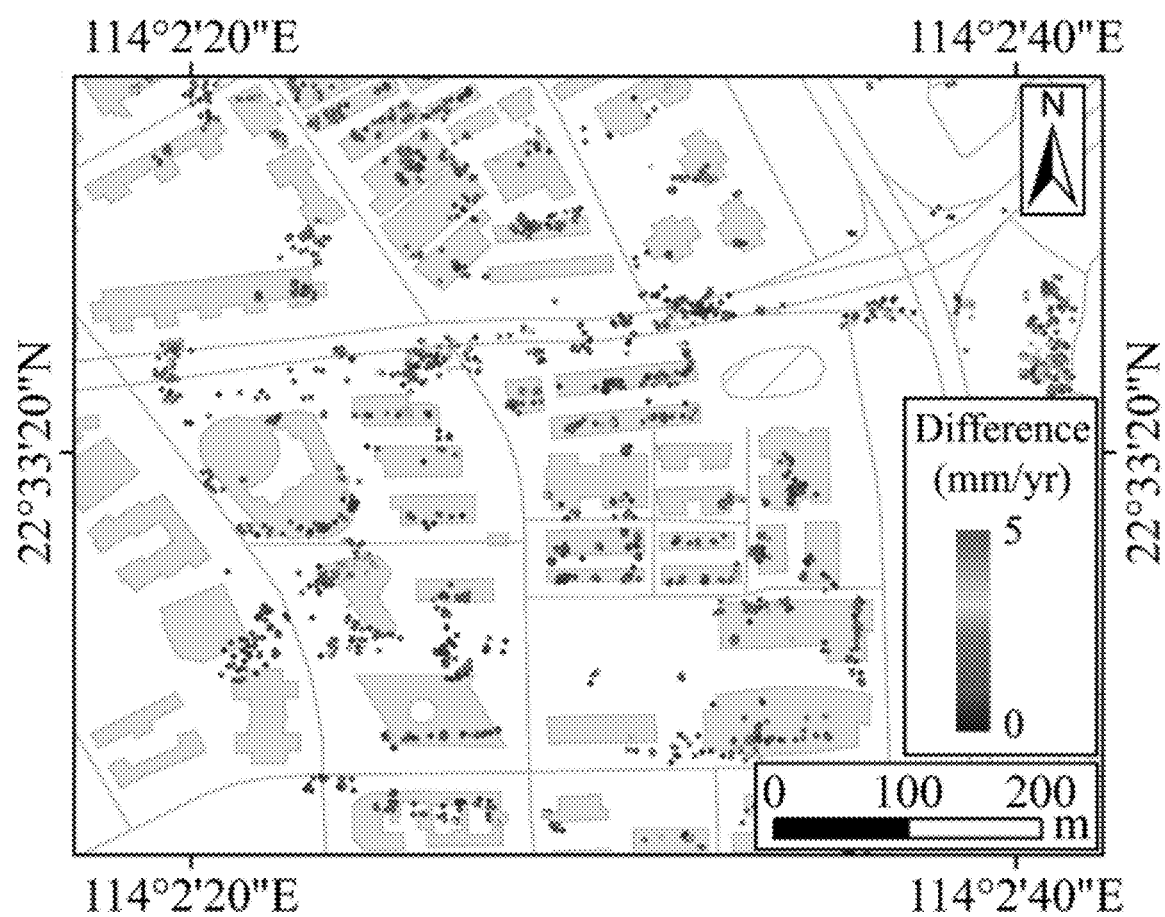
FIG. 8C is the height distribution of COSMO-SkyMed result around Wenbo in the embodiment of the present application.
Figure 8D:
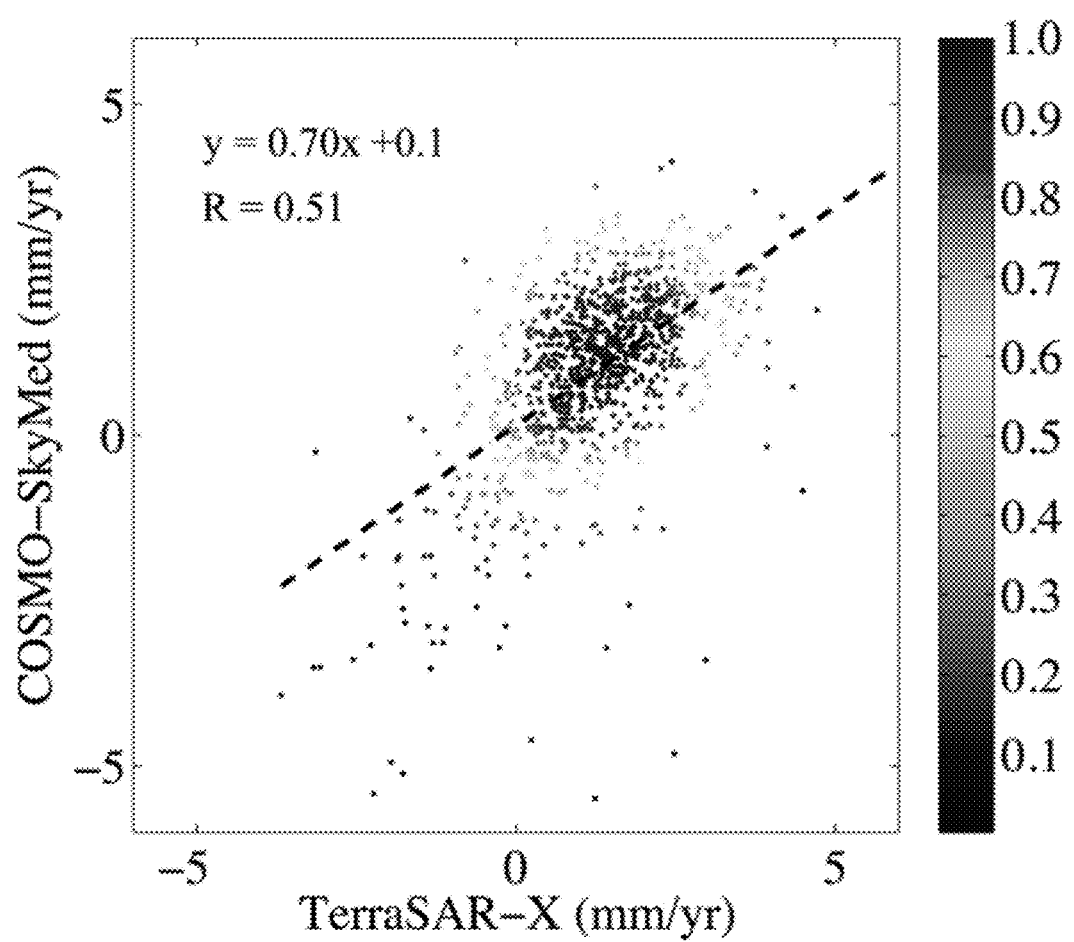
FIG. 8D is a thermal diagram of comparison between TerraSAR-X and COSMO-SkyMed results in the embodiment of the present application.

For the verification of InSAR results, any estimation results may be verified. Because of the real height data of the two research areas, the InSAR results are verified by the height results. Compared with LiDAR (as shown in FIG. 7A, FIG. 7B, FIG. 7C and FIG. 7D), the root mean square error (RMSE) of Kowloon District of Hong Kong is 5.1 m and 6.6 m respectively, both within the acceptable error range. For Futian District of Shenzhen, the real height of buildings near Wenbo Building are obtained, showing good correlation with TerraSAR results (FIG. 8B). By comparison, the RMSE of TerraSAR results (as shown in FIG. 8A) is 6.5 m, which is also within the allowable error range. In addition, in the overlapping time span (May 2011 to March 2013), the deformation results of TerraSAR-X and COSMO-SkyMed's points near the store were cross-verified, and the standard deviation of the difference was 1.3 mm/yr (as shown in FIG. 8C and FIG. 8D), which is also within the allowable error. It is proved that the improved MTInSAR technology may get more accurate measurement accuracy in two verification experimental areas.

Figure 9A:
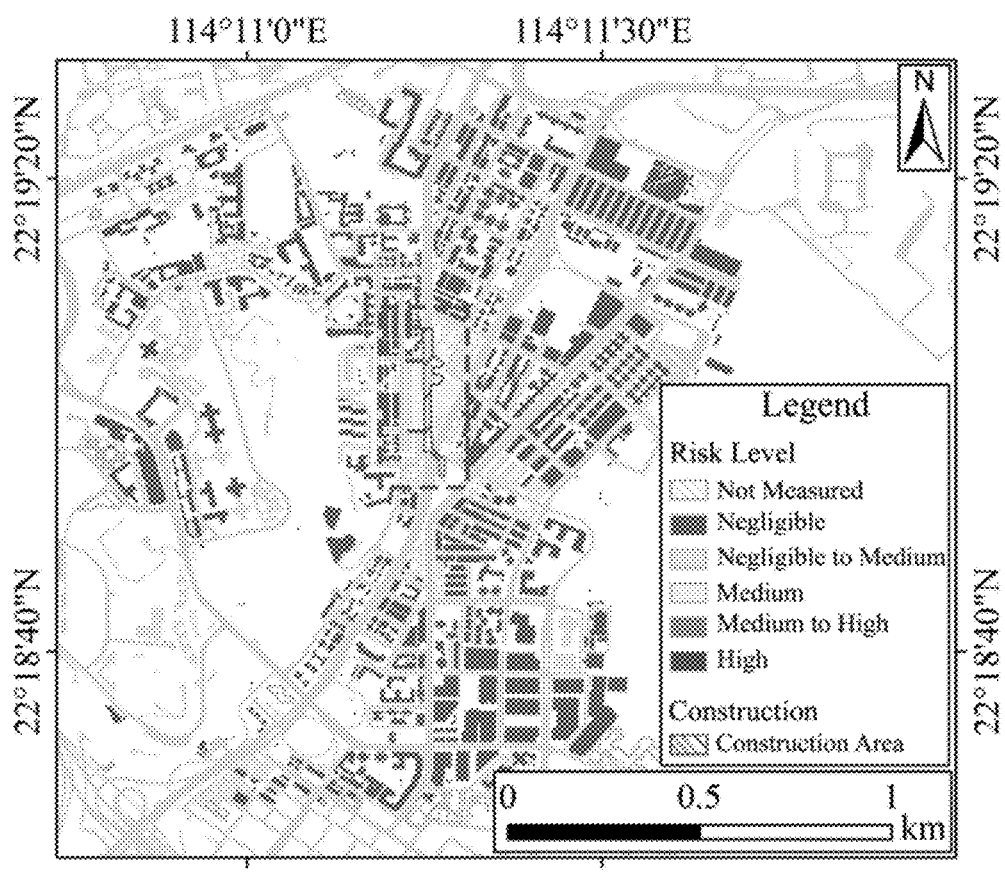
FIG. 9A is a building risk level diagram of Kowloon District in Hong Kong in 2016.
Figure 9B:
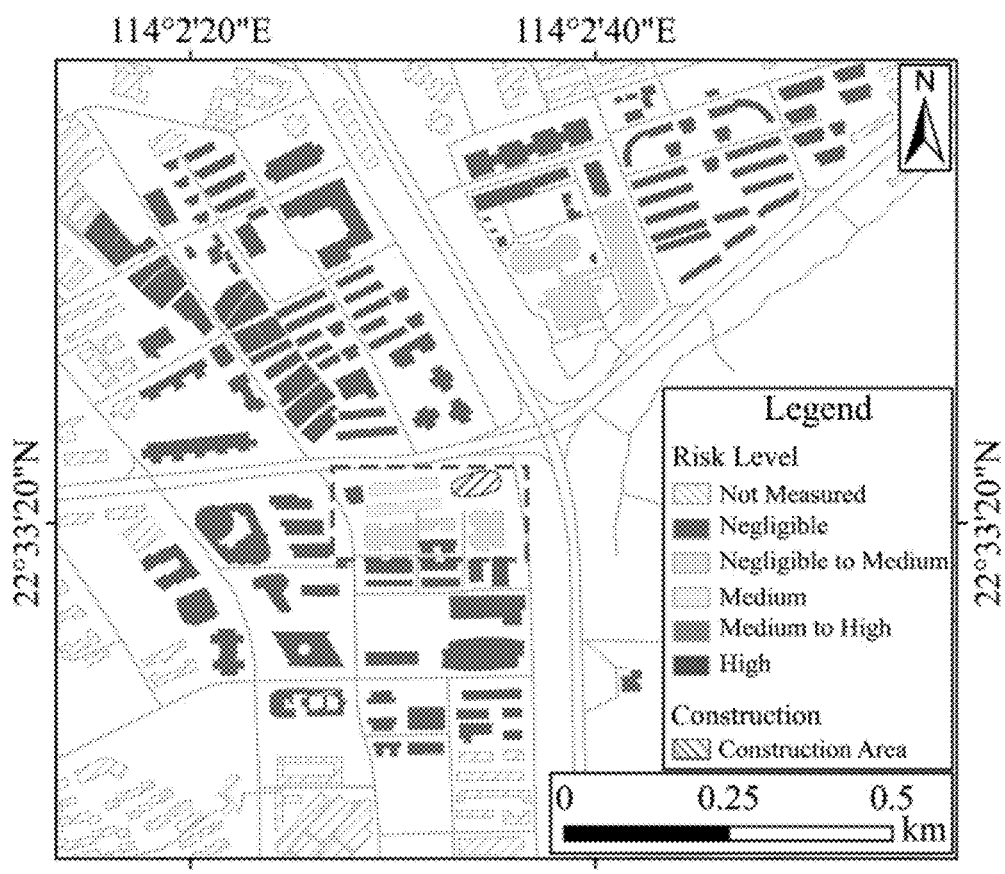
FIG. 9B is the building risk level diagram in Futian District of Shenzhen in 2014.
Figure 9C:
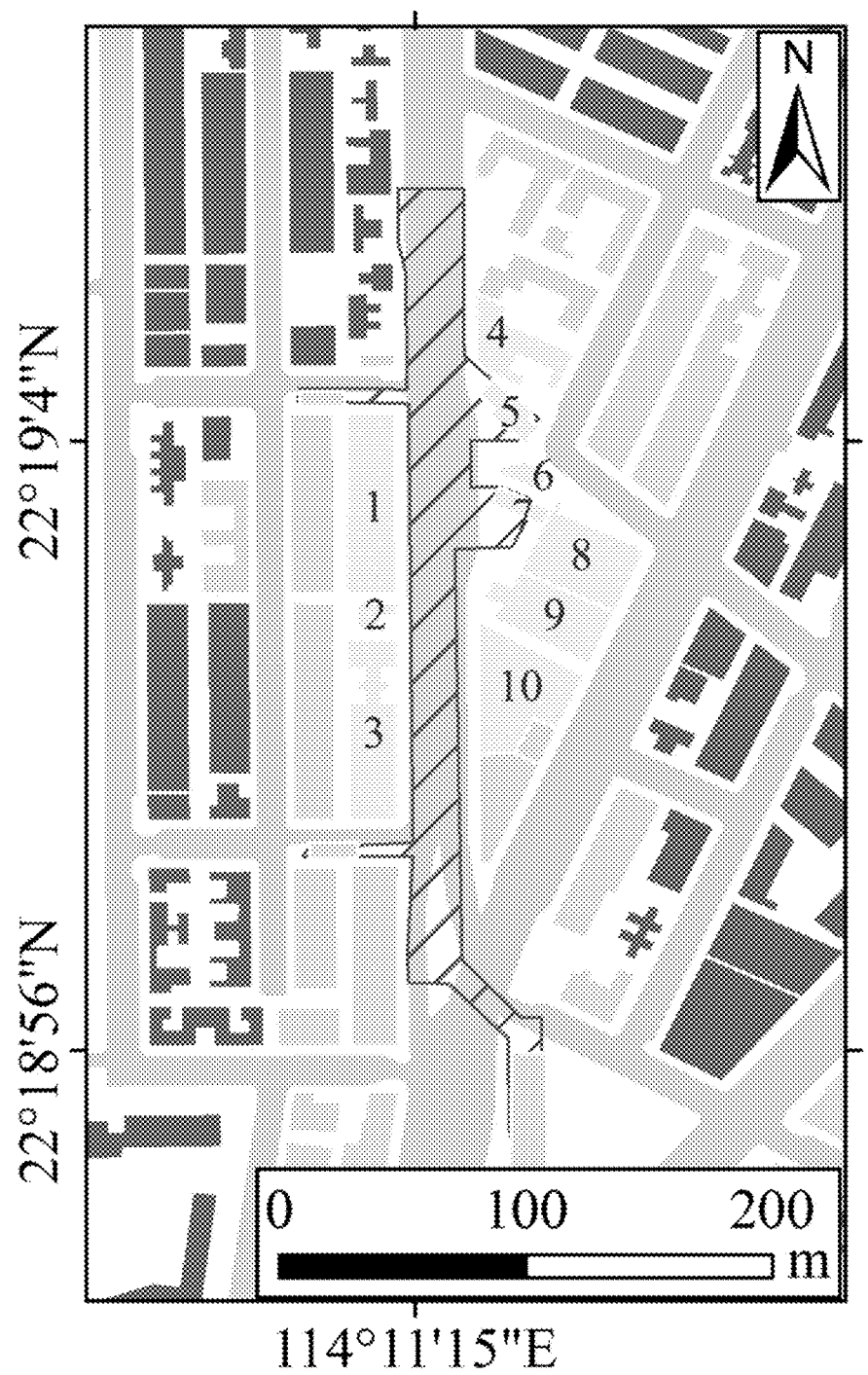
FIG. 9C is the building risk level diagram of To Kwa Wan subway station.
Figure 9D:
FIG. 9D is the building risk level diagram in the neighborhood of Wenbo Building.
Figure 9E:
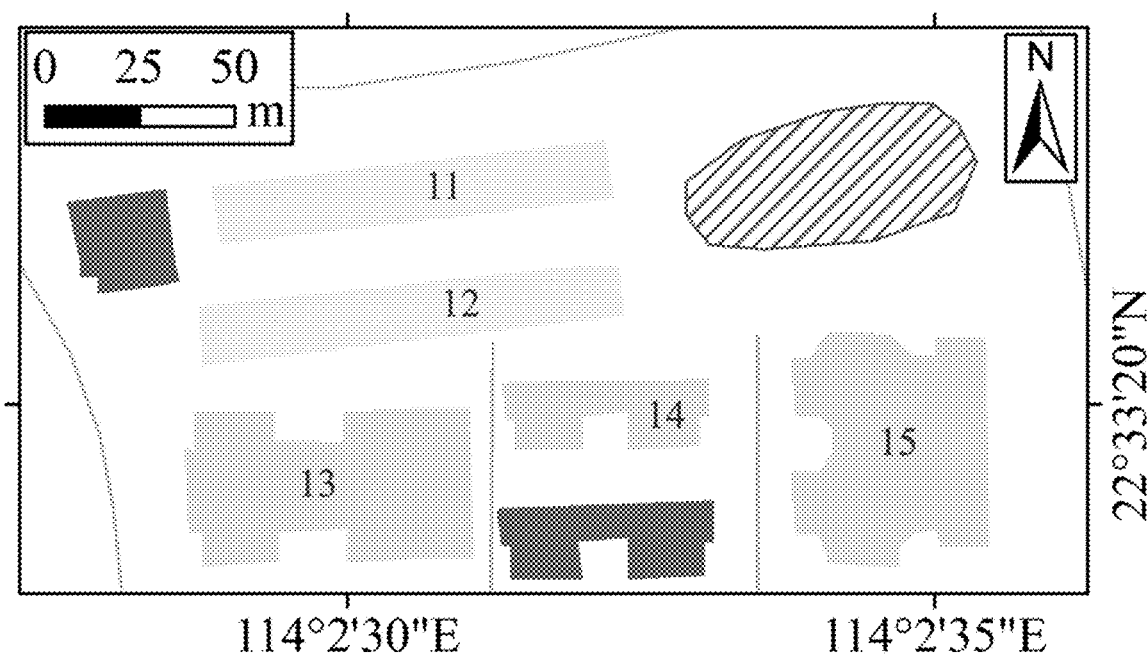
FIG. 9E is a schematic diagram of cracks in the wall of BMW Building.
Figure 9F:
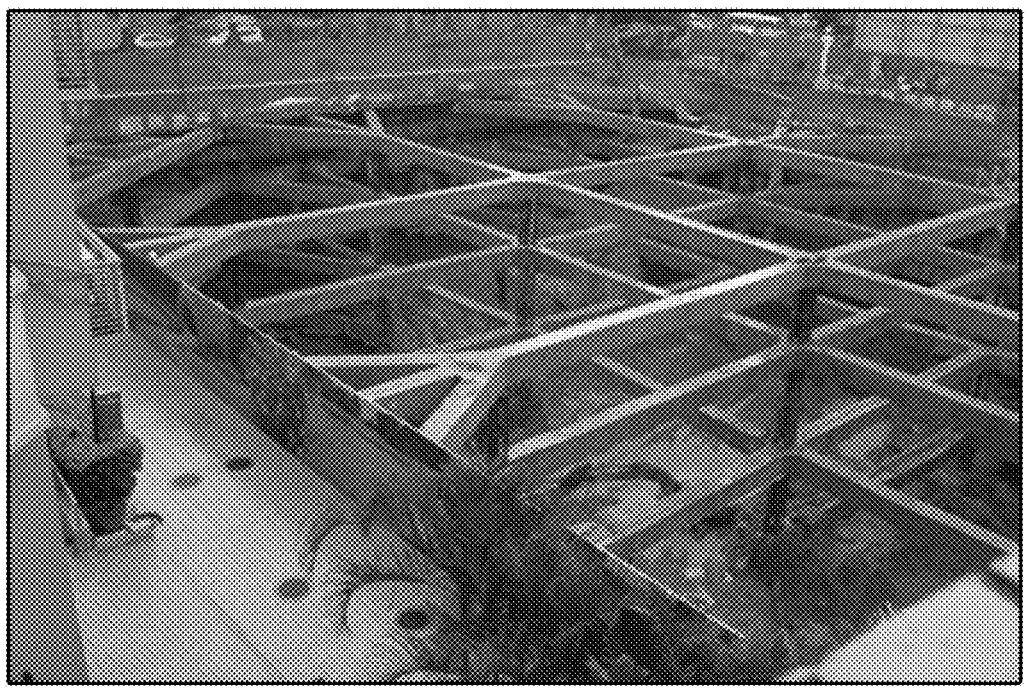
FIG. 9F is a schematic diagram of the subsidence influence of Jingli No. 1 building.

3.2 Building Deformation Indicator Extraction and Risk Assessment Based on X-band High-Precision InSAR Results Based on the method in 2.2, the risk level of large-scale buildings in Kowloon District of Hong Kong and Futian District of Shenzhen is evaluated. As shown in FIG. 9A, among the 807 buildings monitored in Kowloon District, there were 10, 122 and 675 buildings were rated as medium risk, negligible to medium risk and negligible risk respectively. 10 buildings with medium risk level are all located near To Kwa Wan subway station (as shown in FIG. 9C). The building deformation parameters of these 10 buildings, and the building deformation parameters near To Kwa Wan subway station and Wenbo Building are as shown in Table 3, and the maximum subsidence of BMW Building (No. 10) is 7.5 mm/yr, and the maximum angle distortion is 0.0015 rad/yr. According to the field investigation, the wall of BMW Building has cracked (FIG. 9E). The X-band monitoring results in Futian District have detected the deformation of 143 buildings, of which 2, 4 and 137 buildings are classified into medium, negligible to medium and negligible risk levels respectively (FIG. 9B). The maximum subsidence is Jingli No. 1 Building (No. 11, as shown in FIG. 9D), reaching 7.9 mm/yr, and the angle distortion is 0.0008 rad/yr. The subsidence caused the ground to separate from the building (as shown in FIG. 9F). The inclination directions of all buildings in Table 3 indicate that the buildings are affected by the construction and inclined towards the construction area.

TABLE 3

| Building NO. | $D_{max}$ (mm/yr) | $\beta_{max}$ (rad/yr) | Inclination direction |
|---|---|---|---|
| 1 | 6.3 | 0.0005 | East |
| 2 | 6.3 | 0.0008 | East |
| 3 | 6.6 | 0.0015 | East |
| 4 | 5.1 | 0.0010 | West |
| 5 | 5.8 | 0.0013 | West |
| 6 | 6.0 | 0.0015 | West |
| 7 | 7.3 | 0.0002 | West |
| 8 | 7.0 | 0.0015 | West |
| 9 | 7.2 | 0.0010 | West |
| 10 | 7.5 | 0.0015 | West |
| 11 | 7.9 | 0.0008 | East |
| 12 | 6.5 | 0.0008 | East |
| 13 | 2.7 | 0.0005 | North |
| 14 | 3.3 | 0.0008 | North |
| 15 | 2.5 | 0.0005 | North |

Figure 10A:
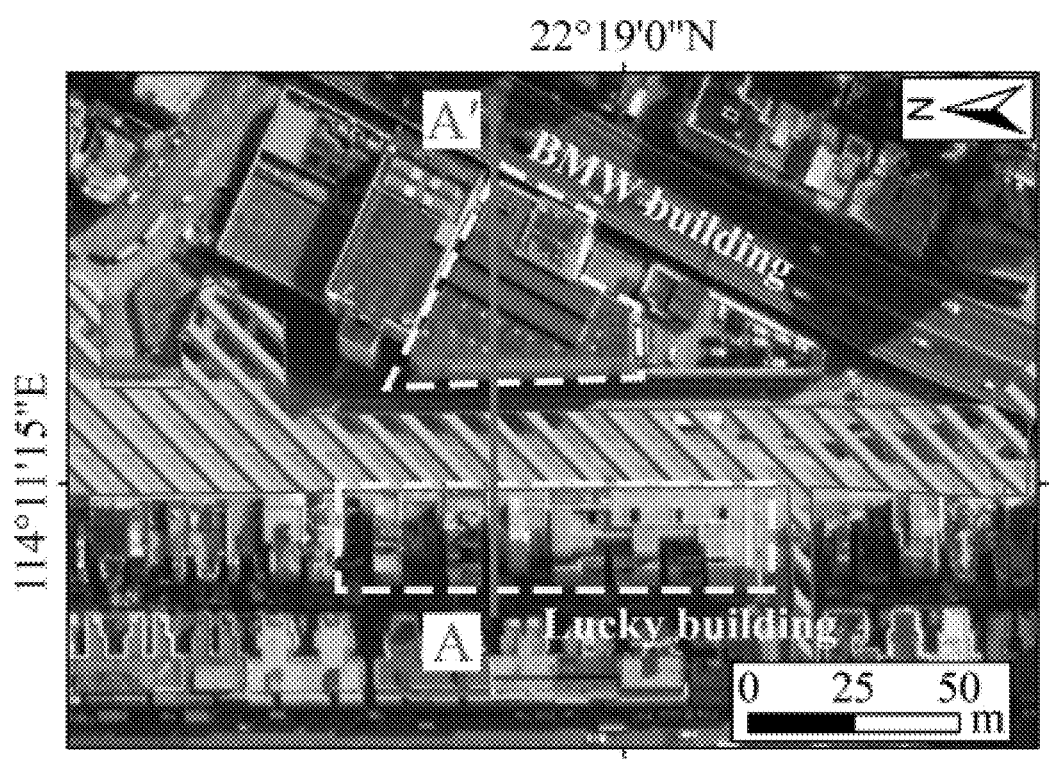
FIG. 10A is a schematic diagram of simulated cross section of To Kwa Wan in the embodiment of the present application.
Figure 10B:
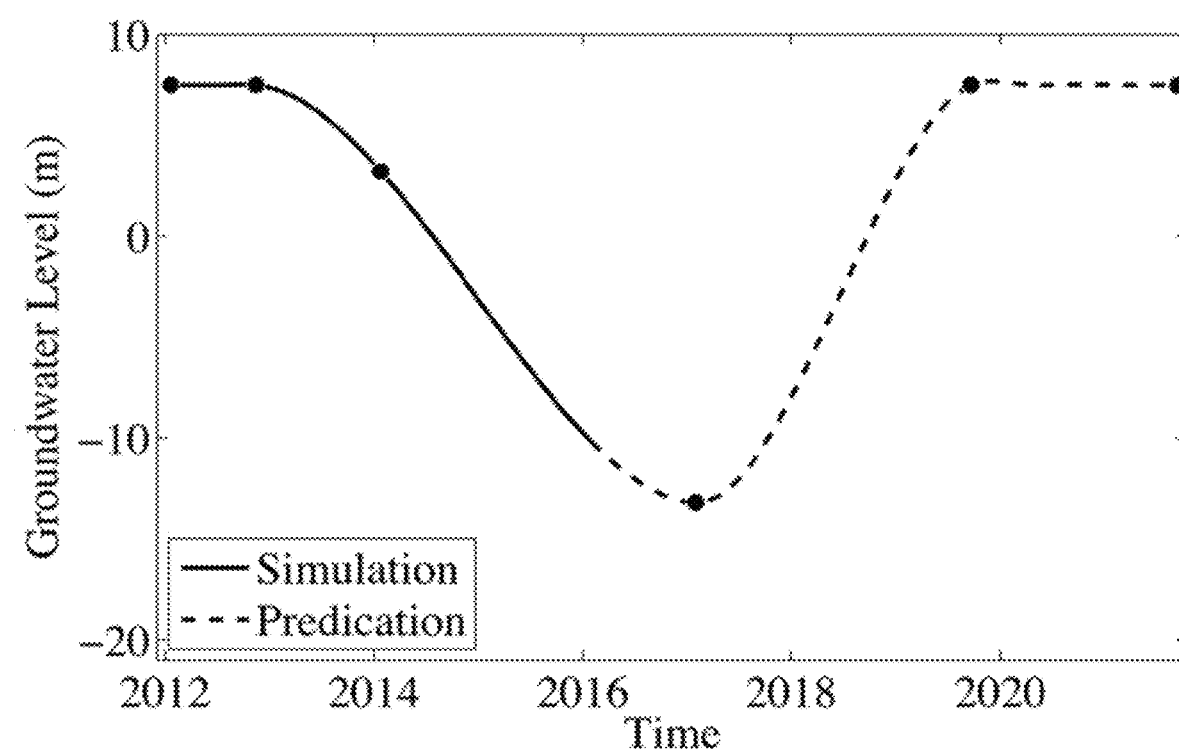
FIG. 10B is the variation curve of groundwater level of the schematic diagram of monitoring To Kwa Wan in the embodiment of the present application.
Figure 10C:
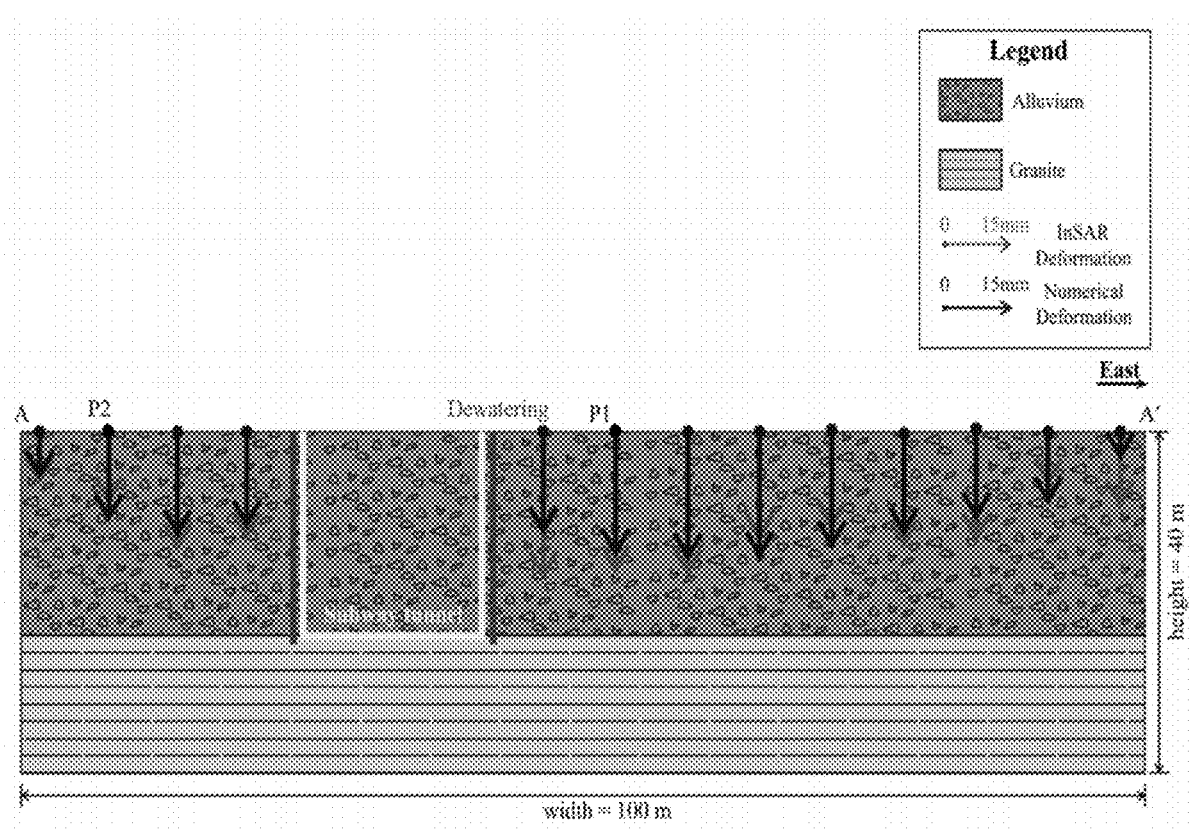
FIG. 10C is a schematic diagram of comparison between InSAR results and numerical simulation model results across To Kwa Wan in the embodiment of the present application.
Figure 10D:
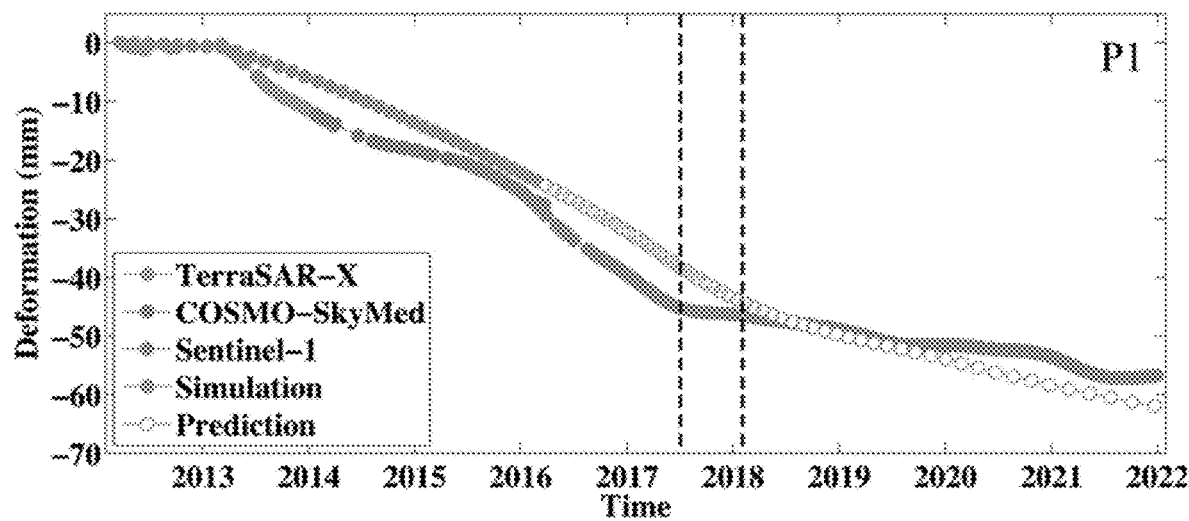
FIG. 10D is a comparison diagram of InSAR time series results and numerical simulation results at point P1 in FIG. 10C.
Figure 10E:
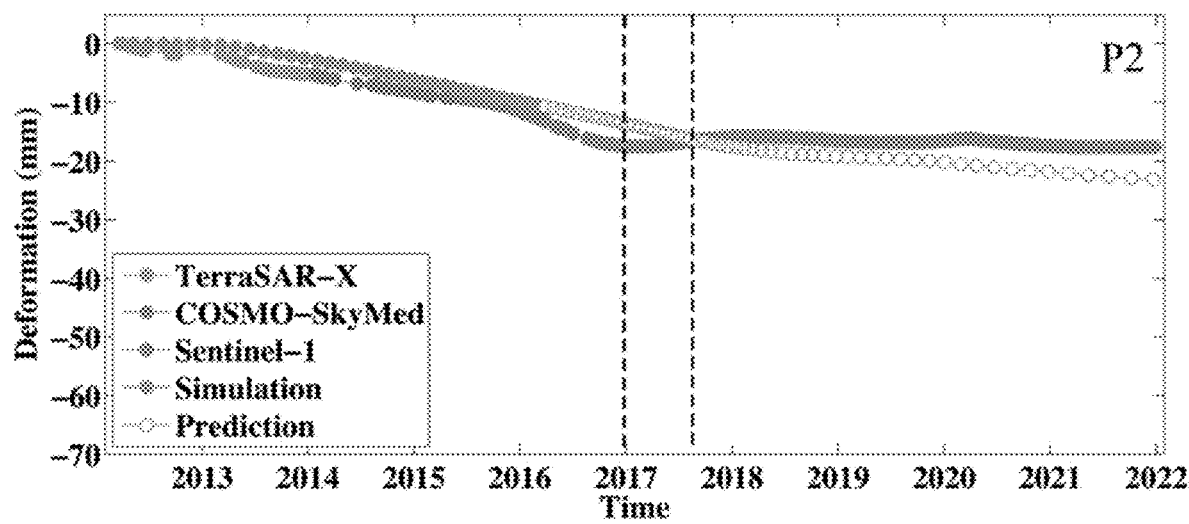
FIG. 10E is the comparison diagram between the InSAR multi-channel time series results and the numerical simulation results at point P2 in FIG. 10C.
Figure 11A:
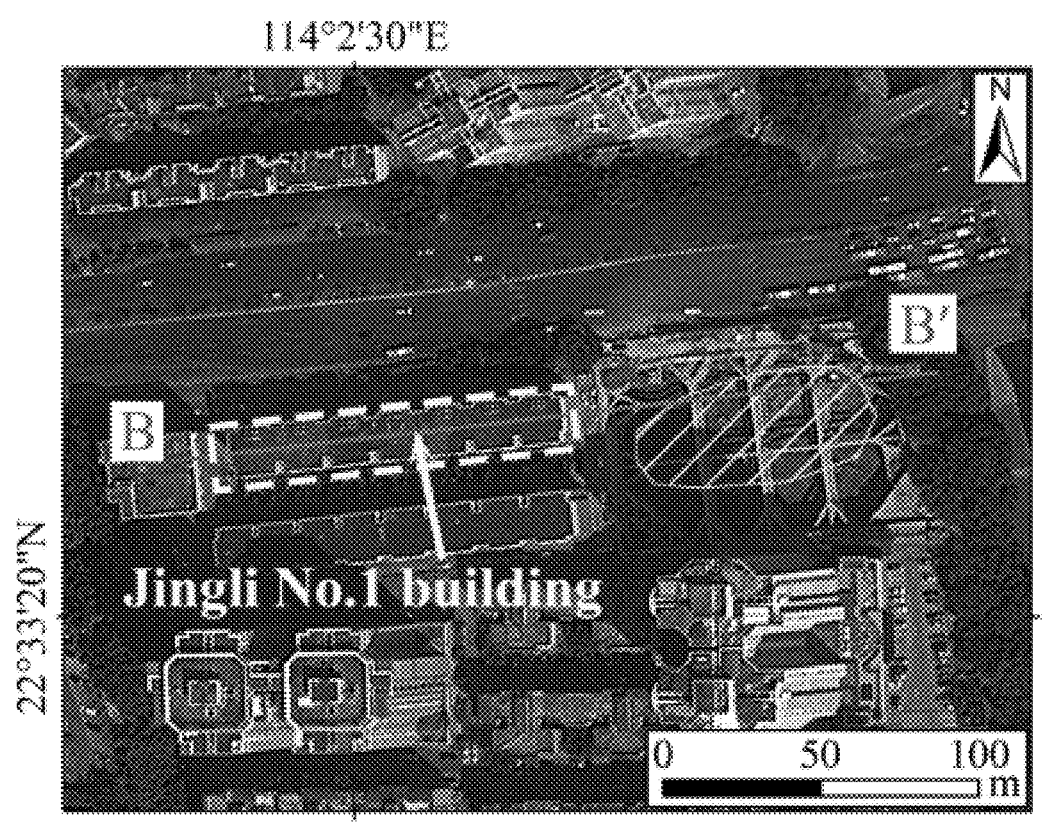
FIG. 11A is a schematic diagram of the simulated cross section of Wenbo Building in the embodiment of the present application.
Figure 11B:
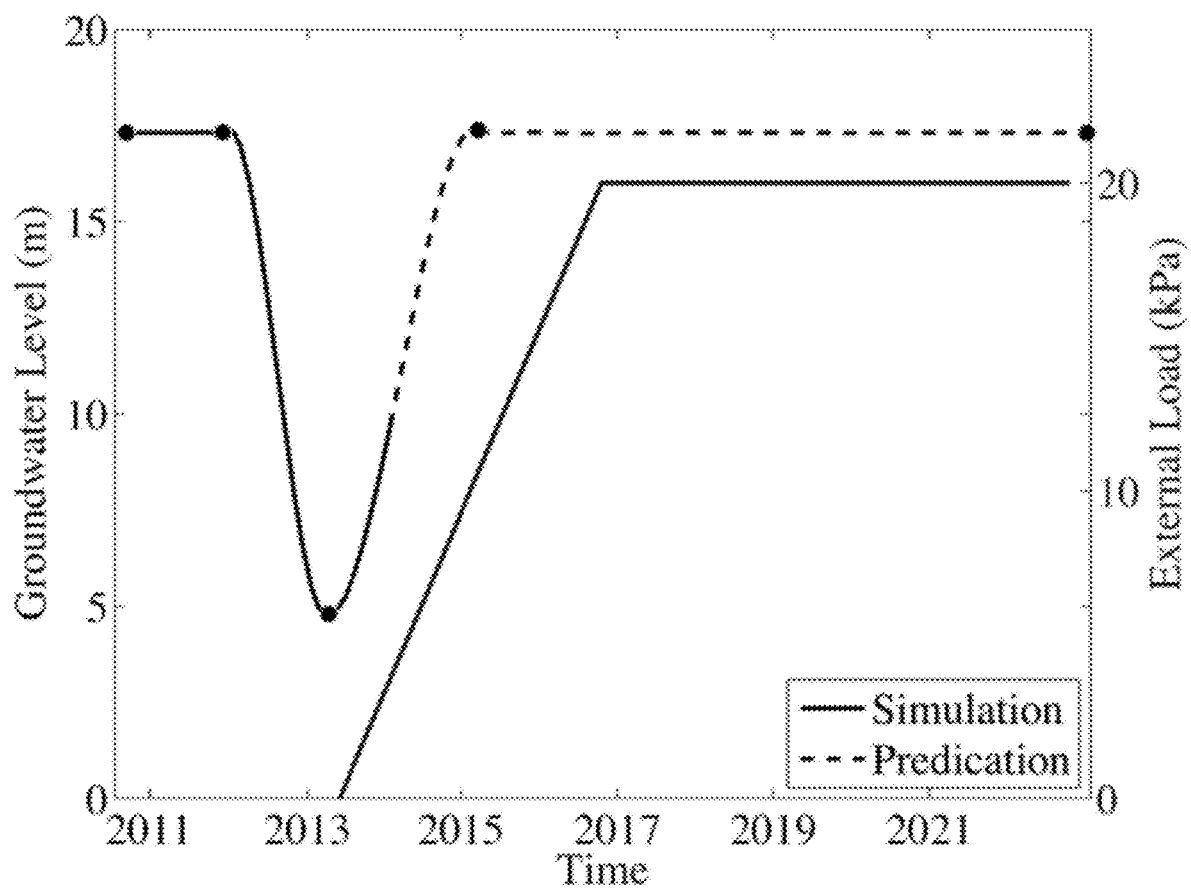
FIG. 11B is the variation curve of groundwater level and stress the schematic diagram of monitoring Wenbo Building in the embodiment of the present application.
Figure 11C:
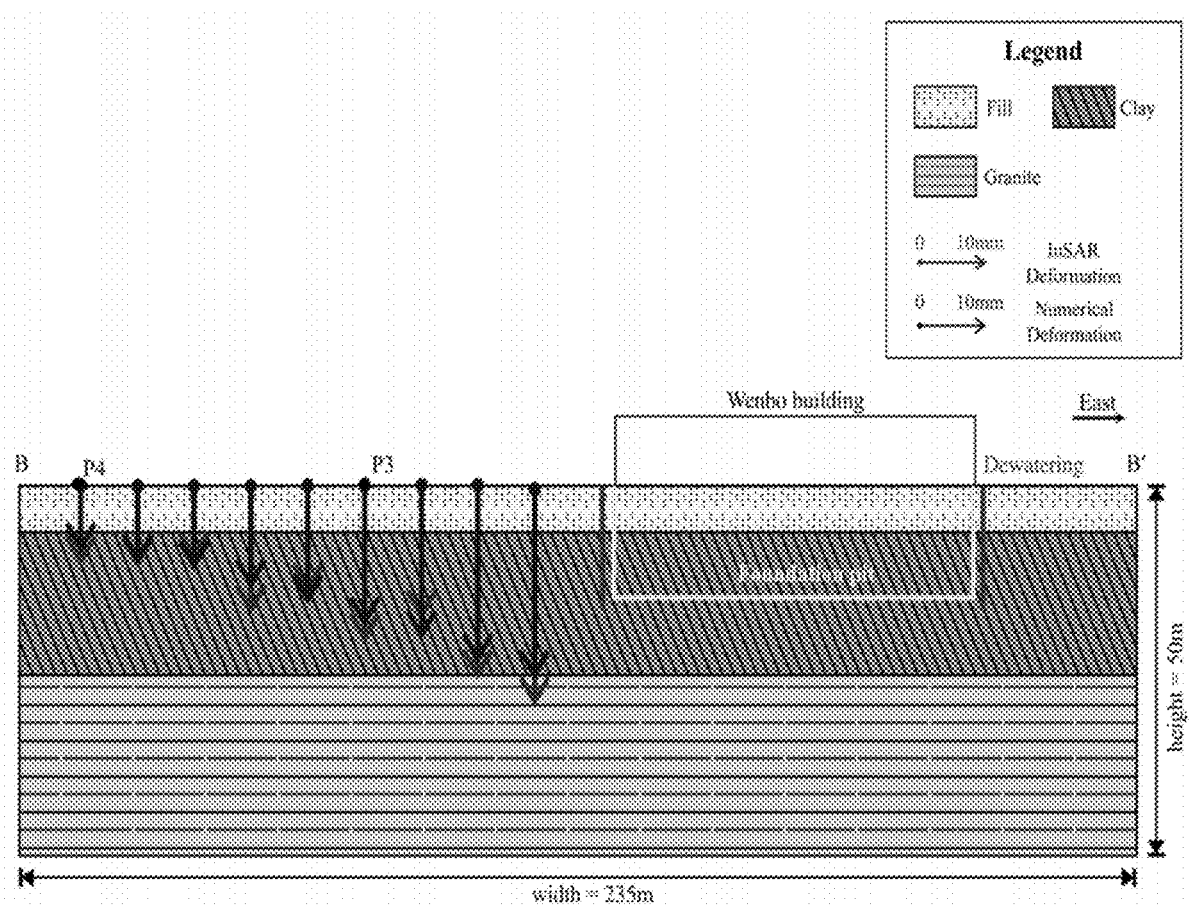
FIG. 11C is a schematic diagram of comparison between InSAR results and numerical simulation model results across Wenbo Building in the embodiment of the present application.
Figure 11D:
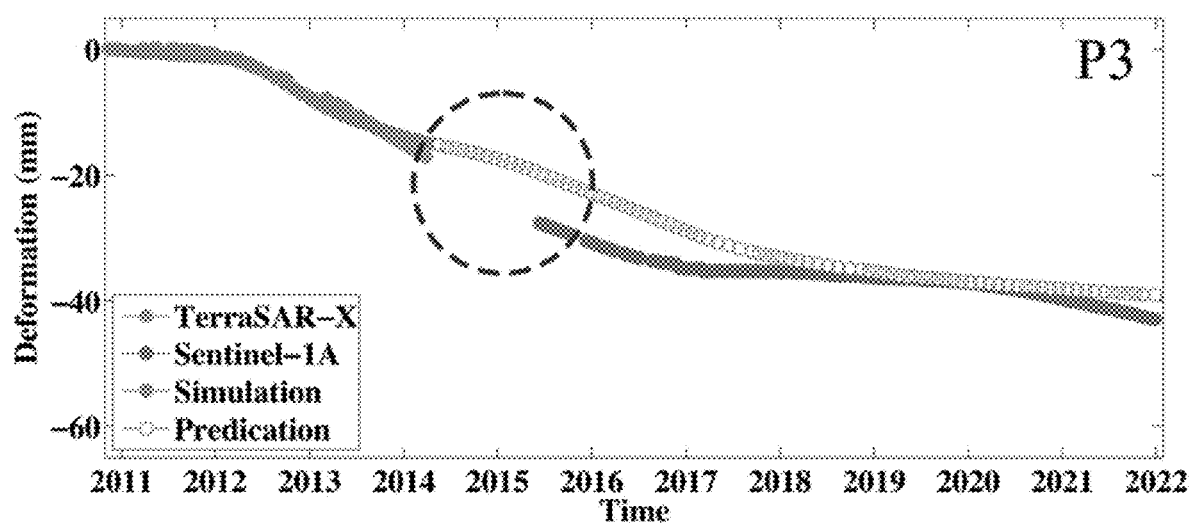
FIG. 11D is the comparison diagram between InSAR multi-channel time series results and numerical simulation results at point P1 of FIG. 11A.
Figure 11E:
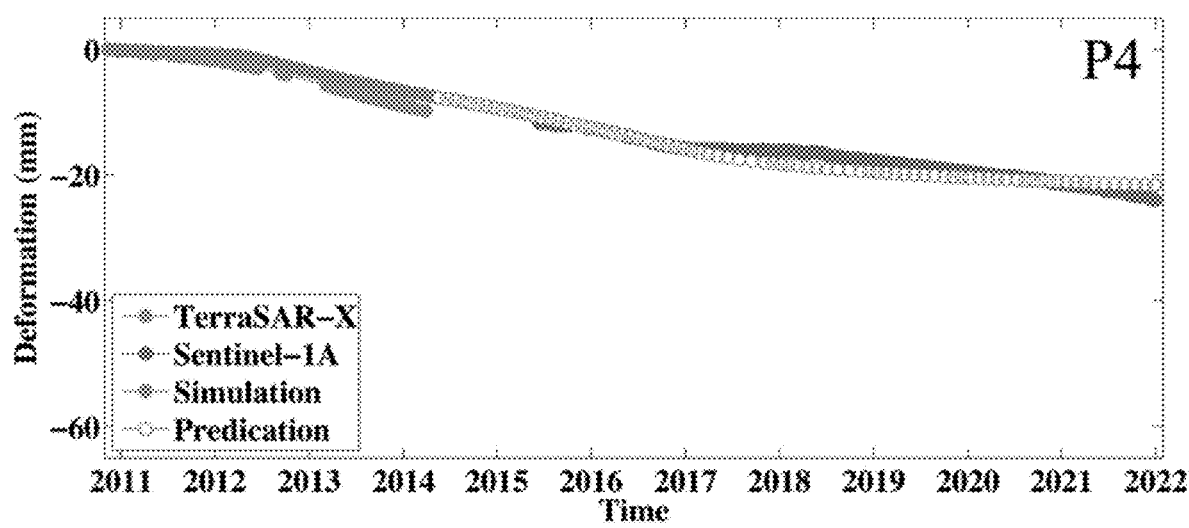
FIG. 11E is the comparison diagram between the InSAR multi-channel time series results and the numerical simulation results at point P2 in FIG. 11A.

3.3 Building Risk Assessment and Prediction Results Based on Stress-Pore Water Pressure Model 3.3.1 Numerical Model and Variable Determination According to the geological conditions of the experimental verification area and the X-band deformation time series results, the basic parameter table of the soil conditions near the To Kwa Wan subway station and Wenbo Building are confirmed, as shown in Table 4, and the coincidence degree of the results can be seen in FIG. 10D and FIG. 10E (with a difference of 3.2 mm and 1.1 mm) and FIG. 11D and FIG. 11E (with a difference of 2 mm and 4 mm).

For the buildings near To Kwa Wan subway station, Lucky Building and BMW Building suffered the most serious subsidence, so numerical simulation was carried out along the cross section AA' (see FIG. 10A and FIG. 10C). For Wenbo Building, numerical simulation is carried out with the cross section BB' (see FIG. 11A and FIG. 11C) of the area where Jingli No. 1 Building is located. According to the set variable function (see FIG. 10B and FIG. 11B), the deformation simulation is continued, and the simulation results show that by 2021, the subsidence of P1 and P2 will reach 61.9 mm and 23.2 mm respectively, which may be roughly compared with the results of Sentinel-1. The subsidence at P3 and P4 will reach 39.0 mm and 21.7 mm respectively.

TABLE 4

| Experimental area | Stratum name | Effective young's modulus(kPa) | Unit weight (kN/m³) | Poisson's ratio | Cohesive force (kPa) |
|---|---|---|---|---|---|
| To Kwa Wan subway station | Alluvium | 15,000 | 20 | 0.33 | 10 |
| | Granite | 200,000 | 18.4 | 0.31 | 29 |
| Wenbo Building | Fill | 10,000 | 18.9 | 0.32 | 10 |
| | Clay | 16,000 | 19.2 | 0.30 | 20 |
| | Granite | 200,000 | 18.4 | 0.31 | 29 |

3.3.2 Building Risk Assessment and Prediction Based on Numerical Simulation

Figure 12A:
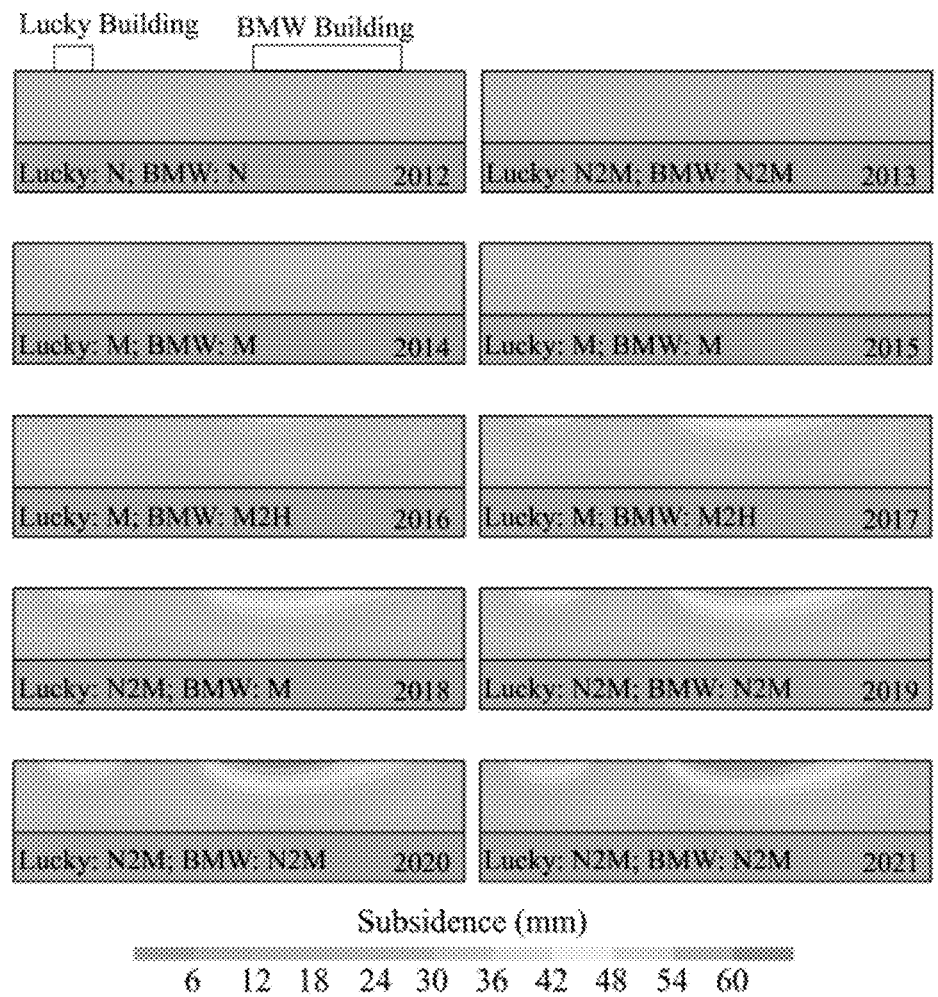
FIG. 12A is diagram of the numerical simulation results from 2012 to 2021 of To Kwa Wan subway station.
Figure 12B:
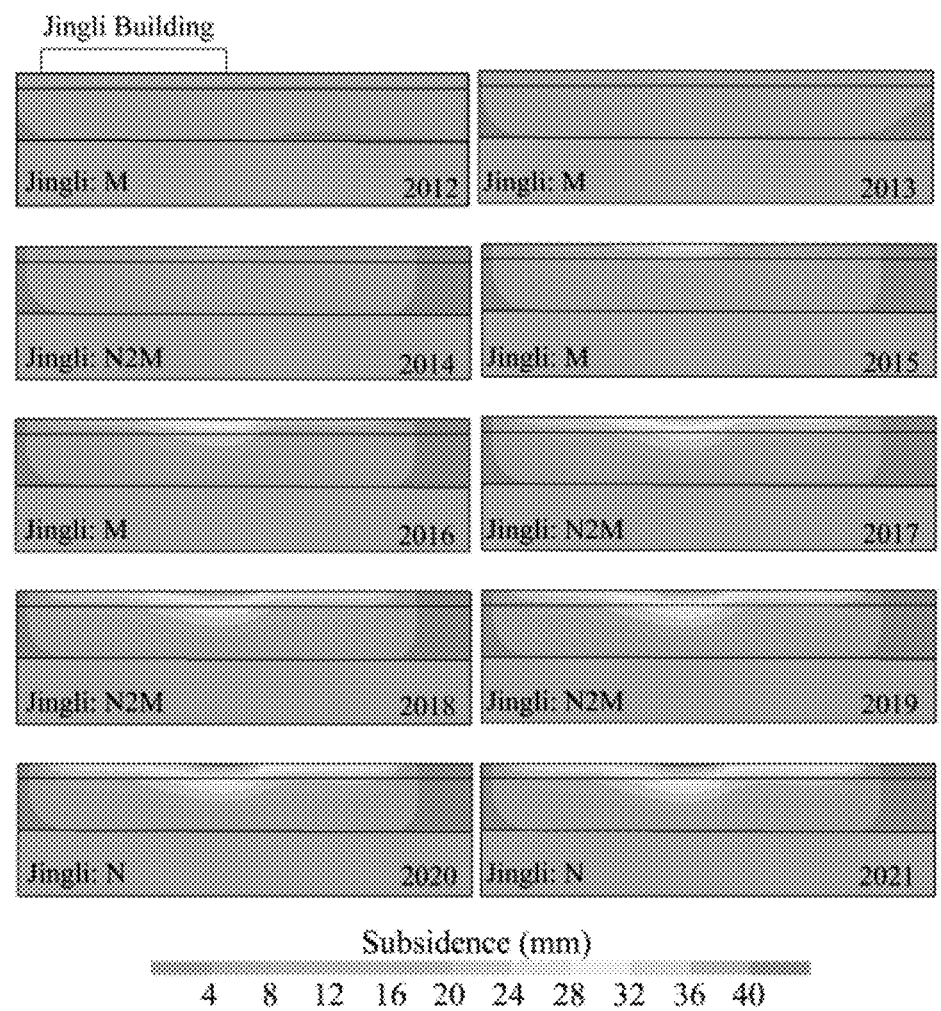
FIG. 12B is diagram of the numerical simulation results from 2012 to 2021 of Wenbo Building.

FIG. 12A and FIG. 12B shows the annual numerical simulation results of two experimental verification areas. According to the building risk assessment methods and indicators mentioned in 2.2, the annual building risk is assessed. Table 5 shows the results of building risk assessment based on numerical simulation. According to the above information, both BMW Building and Lucky Building were in a negligible risk level in 2012, and the construction was not carried out at this time. From 2014 to 2017, Lucky Building reached a medium risk level, and the risk level resumed a negligible level after 2018. BMW Building suffered a serious impact, and the risk level was in a medium risk level from 2014 to 2015, but became a medium to high risk level from 2016 to 2017, and the risk level did not decline until 2019. The change of risk level is basically consistent with the process of subway construction. It can be seen that if the future prediction is carried out in 2015, this place may be repaired in advance to reduce the building risk level. For Jingli No. 1 Building near Wenbo Building, the risk level was relatively high from 2012 to 2016, which was a medium risk level, and after 2017, the risk level began to decline, and it was at a negligible safety risk level until 2020.

TABLE 5

| | BMW Building | | | Lucky Building | | | Jingli No. 1 Building | | |
|---|---|---|---|---|---|---|---|---|---|
| Year | $D_{max}$ (mm/yr) | $\beta_{max}$ (rad/yr) | Risk level | $D_{max}$ (mm/yr) | $\beta_{max}$ (rad/yr) | Risk level | $D_{max}$ (mm/yr) | $\beta_{max}$ (rad/yr) | Risk level |
| 2012 | −0.7 | 0 | N | −0.6 | 0 | N | −7.6 | 0 | M |
| 2013 | −5.0 | 0 | N2M | −4.0 | 0.0002 | N2M | −5.5 | 0.0001 | M |
| 2014 | −7.8 | 0.0001 | M | −6.3 | 0.0002 | M | −3.5 | 0 | N2M |
| 2015 | −8.8 | 0.0001 | M | −6.9 | 0.0003 | M | −5.9 | 0 | M |
| 2016 | −10.3 | 0.0002 | M2H | −7.9 | 0.0004 | M | −6.1 | 0 | M |
| 2017 | −11.6 | 0.0002 | M2H | −8.7 | 0.0004 | M | −4.0 | 0 | N2M |
| 2018 | −6.2 | 0.0001 | M | −4.3 | 0.0002 | N2M | −2.5 | 0 | N2M |
| 2019 | −4.4 | 0.0001 | N2M | −3.0 | 0.0002 | N2M | −1.5 | 0 | N |
| 2020 | −4.4 | 0.0001 | N2M | −3.3 | 0.0002 | N2M | −1.0 | 0 | N |
| 2021 | −3.7 | 0.0001 | N2M | −2.8 | 0.0001 | N2M | −1.0 | 0 | N |

This embodiment has the following technical effects.

The application relates to a method for InSAR assessment and prediction of risk level of urban buildings, which uses multi-channel satellites to jointly monitor the deformation of permanent and distributed scatterers in urban areas, and uses multi-spatio-temporal InSAR and numerical simulation to monitor and predict the building deformation and building risk level. Firstly, on the urban scale, the building risk level is assessed by land subsidence and angle distortion to determine potential dangerous buildings. Then, taking the time series of high-resolution InSAR data as input for reference, combined with geological conditions, the geological and hydrological conditions of the area where dangerous buildings are located are inverted. Finally, the risk level of surrounding buildings is predicted by changing hydrological conditions and external load conditions. The method may be extended to other rapidly developing urban areas prone to land subsidence, so as to assess the risks of urban buildings areas and improve the cognition of dynamic behaviors of land subsidence caused by human activities.

This embodiment puts forward a comprehensive method, which uses improved MTInSAR and numerical model technology to monitor and predict the deformation and risk of buildings, and uses Kowloon District of Hong Kong and Futian District of Shenzhen to verify the effectiveness of this method. It is considered that this method will promote the identification of potentially risky buildings and improve the understanding of the dynamic behavior of land subsidence caused by underground buildings.

The above is only the preferred embodiment of this application, but the protection scope of this application is not limited to this. Any change or replacement that may be easily thought of by a person familiar with this technical field within the technical scope disclosed in this application should be covered by this application. Therefore, the protection scope of this application should be based on the protection scope of the claims.

What is claimed is:

1. A method for InSAR assessment and prediction of risk level of urban buildings, comprising following steps:
obtaining multi-channel SAR images of the urban buildings, extracting monitoring points in the multi-channel SAR images through the double-layer network comprises:
constructing a first-layer network, obtaining preliminary estimation parameters based on a beamforming method, and obtaining permanent scatterers based on the preliminary estimation parameters; wherein the preliminary estimation parameters comprise height parameters and deformation velocity parameters;
based on preprocessed multi-channel SAR images, constructing a second-layer network by a coherent weighted phase link, and obtaining distributed scatterers by identifying pixels in the multi-channel SAR images by a time coherence threshold, and obtaining InSAR monitoring results of the urban buildings based on areas of the monitoring points, wherein the monitoring points comprise the permanent scatterers and the distributed scatterers;
obtaining building outlines, obtaining building deformation parameters based on the building outlines and the InSAR monitoring results comprises:
generating the deformation velocity parameters into spatially continuous grid data, obtaining the building outlines based on the grid data, and calculating the building deformation parameters based on the building outlines and the InSAR monitoring results, and assessing a building risk level comprises:
obtaining risk assessment indicators, and assessing the building risk level based on the building deformation parameters through the risk assessment indicators;
wherein the risk assessment indicators comprise a building inclination direction, an annual minimum subsidence, an annual maximum subsidence, a differential subsidence, based on the building deformation parameters, wherein the building deformation parameters comprise the deformation velocity parameters and angle distortion parameters;
carrying out a time series fusion on the InSAR monitoring results to obtain a time series of SAR images, constructing a stress-pore water pressure model, inputting the time series of SAR images into the stress-pore water pressure model to obtain numerical simulation results, and carrying out a building risk prediction on the numerical simulation results based on a set building risk level.

2. The method for InSAR assessment and prediction of risk level of urban buildings according to claim 1, wherein the multi-channel SAR images comprise TerraSAR-X satellite images, COSMO-SkyMed satellite images and Sentinel-1 satellite images.

3. The method for InSAR assessment and prediction of risk level of the urban buildings according to claim 1, wherein extracting the monitoring points in the multi-channel SAR images comprises:

preprocessing the multi-channel SAR images, constructing a double-layer network based on the preprocessed multi-channel SAR images, and extracting the monitoring points in the multi-channel SAR images through the double-layer network.

4. The method for InSAR assessment and prediction of risk level of the urban buildings according to claim 1, wherein inputting the time series of SAR images into the stress-pore water pressure model comprises:

constructing the stress-pore water pressure model, and obtaining soil parameters by an inversion based on the InSAR monitoring results, and inputting the soil parameters into the stress-pore water pressure model, and carrying out a numerical simulation on a bottom deformation and a pore water pressure respectively.

5. The method for InSAR assessment and prediction of risk level of the urban buildings according to claim 1, wherein carrying out the building risk prediction on the numerical simulation results comprises:

inputting groundwater level change parameters and external force change parameters into the stress-pore water pressure model, and predicting the building risk level by changing the groundwater level change parameters and the external force change parameters based on the set building risk level.

* * * * *